*US009267188B2*

United States Patent
Elsafty et al.

(10) Patent No.: US 9,267,188 B2
(45) Date of Patent: Feb. 23, 2016

(54) METHOD FOR EXTRACTION AND SEPARATION OF LANTHANOID ELEMENTS AND ACTINOID ELEMENTS, AND MEANS FOR EXTRACTION AND SEPARATION OF LANTHANOID ELEMENTS AND ACTINOID ELEMENTS

(75) Inventors: Sherif Elsafty, Tsukuba (JP); Kohmei Halada, Tsukuba (JP)

(73) Assignee: National Institute for Materials Science, Tsukuba-shi (JP)

( * ) Notice: Subject to any disclaimer, the term of this patent is extended or adjusted under 35 U.S.C. 154(b) by 239 days.

(21) Appl. No.: 13/985,168

(22) PCT Filed: Feb. 21, 2012

(86) PCT No.: PCT/JP2012/055007
§ 371 (c)(1),
(2), (4) Date: Oct. 21, 2013

(87) PCT Pub. No.: WO2012/115273
PCT Pub. Date: Aug. 30, 2012

(65) Prior Publication Data
US 2014/0033868 A1 Feb. 6, 2014

Related U.S. Application Data

(60) Provisional application No. 61/445,132, filed on Feb. 22, 2011.

(51) Int. Cl.
*C22B 3/24* (2006.01)
*C22B 59/00* (2006.01)
(Continued)

(52) U.S. Cl.
CPC ........... *C22B 59/00* (2013.01); *B01J 20/28011* (2013.01); *B01J 20/28057* (2013.01);
(Continued)

(58) Field of Classification Search
CPC ............... B01J 20/3204; B01J 20/3253; B01J 20/3255; B01J 20/28057; B01J 20/28011; B01J 20/2083
See application file for complete search history.

(56) References Cited

U.S. PATENT DOCUMENTS 4,732,887 A * 3/1988 Obanawa et al. ............. 502/402
6,843,921 B2 * 1/2005 Kuraoka et al. ............... 210/682
(Continued)

FOREIGN PATENT DOCUMENTS

CN 101088597 A * 12/2007
JP 50-3975 2/1975
(Continued)

OTHER PUBLICATIONS

Harutaka et al. Patent No. JP 2003-215292 A published Jul. 2003. Machine translation and original text.*
(Continued)

*Primary Examiner* — George Wyszomierski
*Assistant Examiner* — Tima M McGuthry Banks
(74) *Attorney, Agent, or Firm* — William C. Schrot; Jeffrey I. Auerbach; AuerbachSchrot LLC

(57) ABSTRACT

Problem: To provide a material and a method for efficient and inexpensive extraction of rare metals that are included in urban minerals. Solution: A method for the extraction of lanthanoid elements and actinoid elements, said method comprising: an adsorption process wherein a metal-dissolved solution containing a target metal selected from lanthanoid elements and actinoid elements is made to come into contact with porous structures that carry metal-adsorbent compounds that are adsorbent to target metal ions so that the target metal ions in said solution are adsorbed by said metal-adsorbent compounds; and a target metal separation process wherein said porous structures are made to come into contact with a back-extraction solution so that the target metal ions that are adsorbed by said metal-absorbent compounds are transported to the back-extraction solution.

20 Claims, 13 Drawing Sheets

(51) Int. Cl.
*C22B 60/00* (2006.01)
*B01J 20/32* (2006.01)
*B01J 20/28* (2006.01)
*C22B 60/02* (2006.01)

(52) U.S. Cl.
CPC ........ *B01J 20/28083* (2013.01); *B01J 20/3204* (2013.01); *B01J 20/3253* (2013.01); *B01J 20/3255* (2013.01); *C22B 3/24* (2013.01); *C22B 60/02* (2013.01)

(56) References Cited

U.S. PATENT DOCUMENTS

| | | | |
|---|---|---|---|
| 2008/0053902 A1* | 3/2008 | Koegler et al. | 210/638 |
| 2008/0083672 A1* | 4/2008 | Dong et al. | 210/660 |
| 2010/0304139 A1* | 12/2010 | Chang et al. | 428/402 |

FOREIGN PATENT DOCUMENTS

| | | |
|---|---|---|
| JP | 56-87634 | 7/1981 |
| JP | 62-83037 | 4/1987 |
| JP | 1-96014 | 4/1989 |
| JP | 2-133532 | 5/1990 |
| JP | 3-225299 | 10/1991 |
| JP | 3-264899 | 11/1991 |
| JP | 7-100371 | 4/1995 |
| JP | 2003-215292 | 7/2003 |
| JP | 2004-20546 | 1/2004 |
| JP | 2004-28633 | 1/2004 |
| JP | 3829188 | 7/2006 |
| JP | 2007-327886 | 12/2007 |
| JP | 2007-327887 | 12/2007 |
| WO | WO 2011/090086 | 7/2011 |

OTHER PUBLICATIONS

El-Safty, S. (2009) "Organic-Inorganic Hybrid Mesoporous Monoliths for Selective Discrimination and Sensitive Removal of Toxic Mercury Ions," J. Mater. Sci. 44:6764-6774.

International Search Report, PCT/JP2012/055007 (2012); 6 pages.

\* cited by examiner

METHOD FOR EXTRACTION AND SEPARATION OF LANTHANOID ELEMENTS AND ACTINOID ELEMENTS, AND MEANS FOR EXTRACTION AND SEPARATION OF LANTHANOID ELEMENTS AND ACTINOID ELEMENTS

TECHNICAL FIELD

The present invention relates to a method and a means for extracting and separating target metals consisting of lanthanoid elements and actinoid elements from a metal-dissolved solution in which various metals including lanthanoid elements and actinoid elements are dissolved. In particular, the present invention relates to a solid phase that selectively adsorbs lanthanoid elements and actinoid elements and a solid phase extraction method that uses the solid phase.

BACKGROUND ART

Global demand is rapidly rising for metals, especially rare metals, that are used in mobile telephones, personal computers and the like. However, price fluctuations of such metals can be rampant not just because of limited deposits and manufacturing quantities but also because of the unbalanced distribution of countries having such deposits and of political controls implemented on production quantity by countries with the resource. Securing a stable supply of rare metals has become extremely important. At the same time, the amount of rare metals that are used in mobile telephones, personal computers and the like that are discarded is also rapidly increasing. The recovery of rare metals from such waste has become an imperative. (Such waste that includes rare metals and precious metals is sometimes referred to as urban minerals.) However, since minerals and urban minerals that contain rare metals also contain many other metals, the process for the recovery of the desired metals (target metals) is complicated. No suitable recovery method has been available in the past, making the recovery cost high and the recovery effort to not make economic sense.

Among rare metals, much attention is now focused on lanthanoid elements, also referred to as rare earth elements, which exhibit special properties such as magnetism and light emission and make such elements indispensable for the high-tech technologies. "Lanthanoid element" is a collective term that refers to any of the 15 elements ranging from lanthanum with an atomic number of 57 to lutetium with an atomic number of 71. The special properties of lanthanoid elements derive from the fact that the outermost shell of the electron orbit is overlapped by other electrons and that the inner shell of the 4f electron orbit is filled with electrons. Because the electron orbit of the outermost shell is overlapped by other electrons, the chemical properties of any two lanthanoid elements are very similar, making it extremely difficult to separate two lanthanoid elements from each other. Natural minerals that contain lanthanoid elements often contain a plurality of different lanthanoid elements and actinoid elements as well. On the periodic table, actinoid elements belong to the same group 3 of elements as do the lanthanoid elements. Because the inner shells of actinoid elements are similarly filled with electrons, the chemical properties of any two actinoid elements are similar to each other, and the chemical properties of actinoid elements are also similar to those of lanthanoid elements. This makes it difficult to separate lanthanoid elements from actinoid elements when lanthanoid elements and actinoid elements coexist. Moreover, since actinoid elements include radioactive substances, it is indispensable when using lanthanoid elements that they be separated from actinoid elements, another factor that further complicates the extraction of lanthanoid elements. "Actinoid element" is a collective term that refers any of the 15 elements ranging from actinium with an atomic number of 89 to lawrencium with an atomic number of 103.

Currently, multi-stage extraction methods are used for the separation and recovery of lanthanoid elements and actinoid elements where slight differences in chemical properties to solvents are used in extraction processes involving the repetition of dozens to over 100 process steps to gradually increase the separation ratio. However, such multi-step extraction methods use large amounts of solvents and desorption agents, generate large amounts of waste solution and impose high processing costs and environmental costs.

In the field of elemental analysis, a field unrelated to methods of extraction of lanthanoid elements and actinoid elements, various research is under way looking into the use of mesoporous silica for the detection of metal ions. For example, Patent Literature 1 and 2 describe the use of hybrid sensors featuring colorant molecules such as aminoporphyrin, dithizone and porphyrin sulfone that are carried by mesoporous silica. Pb ions, Cd ions, mercury ions, Cr ions and the like are made to adsorb to the colorant molecules, and the changes in spectroscopic spectra are used to detect ion concentrations.

CITATION LIST

Patent Literature

PTL 1: Patent 2007-327886
PTL 2: Patent 2007-327887
PTL 3: Patent 3829188

SUMMARY OF INVENTION

Technical Problem

As afore-described, the multi-step extraction methods that are now being commercially used for the separation and recovery of lanthanoid elements and actinoid elements use large amounts of solvents and desorption agents, generate large amounts of waste solution and incur much processing cost and environmental cost.

There has been much research and development to solve these problems. One example is a technology to form metal complexes of lanthanoid elements and actinoid elements. With a metal complex, a plurality of coordinate bonds is formed between elements that form organic molecules and metallic elements, thus forming a stable structure. However, in terms of ionic radius, since the inner shell 4f electrons of lanthanoid elements and actinoid elements affect the coordinate bonds of metal complexes that are formed, it is possible for metal complexes that are formed to have a variety of different properties and be sensitive to effects of factors such as the pH of a solution. However, no effective separation and extraction method has been found to date.

Furthermore, even if a method were to be found for the formation of metal complexes of lanthanoid elements and actinoid elements and the separation of lanthanoid elements and actinoid elements, the separation of the complexes that are formed and dispersed throughout the solution will generate large amounts of waste solution just as with the solvent extraction methods. Thus, this creates a need for a technology to separate as a solid phase the metal complexes that are selectively formed. If a solution has a high concentration of the elements of interest (e.g., from several percent to several dozen percent), the electrochemical properties of the complex can be used to create aggregates and precipitates that are filtrable. However, since lanthanoid elements and actinoid elements require their separation from a very diluted state where the concentration is less than several percent, it has been difficult to convert the metal complexes that are formed in a solution to a solid phase.

It is therefore the object of the present invention to provide a method and a means for easily and efficiently separating and extracting target metals (especially lanthanoid elements and actinoid elements) from a metal-dissolved solution containing a variety of dissolved metals. It is a further object of the present invention to provide a method and means for separation and extraction that reduce the amount of waste solution, processing cost and environmental cost.

Solution to Problem

One of the present inventions is a method for the extraction of lanthanoid elements and actinoid elements. The method includes: an adsorption process wherein a metal-dissolved solution that includes a target metal that is selected from lanthanoid elements and actinoid elements is brought into contact with porous structures carrying metal-adsorbent compounds that adsorb ions of said target metal so that the target metal ions in the solution are adsorbed to the metal-adsorbent compounds; and a separation process wherein the porous structures are brought into contact with a back-extraction solution so as to transport to the back-extraction solution the target metal ions that are adsorbed to the metal-adsorbent compounds.

Here, the term "metal-adsorbent compounds" refers to compounds that can adsorb target metal ions (such as lanthanoid elements and actinoid elements). With the extraction method according to the present invention, metal-adsorbent compounds are carried by a supporting body. Metal complexes are formed from the carried metal-adsorbent compounds and the target metal ions, thus capturing the target metal. The captured target metal and the supporting body are removed from the solution, thus separating the target metals from the metal-dissolved solution. The supporting body carrying the metal-adsorbent compounds that have captured the target metal is placed in a solution environment that causes the target metal ions to separate from the complex, thus separating the isolated ions with a high concentration into a back-extraction solution. The target metals can then be separated as oxides, hydroxides and the like through subsequent chemical processes.

With the extraction method according to the present invention, examples of supporting bodies that can be used are nanostructures with a highly ordered structure such as nanorods, nanotubes, and highly ordered mesoporous structures (HOM) such as mesoporous silica. With rare metals and precious metals other than lanthanoid elements and actinoid elements, attempts are being made to use cellulose, agarose, vinyl chloride, chitosan, Nafion and the like as supporting bodies for complex-forming molecules. However, these polymers are limited in the density with which they can carry complex-forming molecules and also pose steric hindrance because of the complicated steric structure of the polymers. The separation efficiency of polymers that have been found so far has been very low, and the use of these polymers for the extraction of diluted lanthanoid elements and actinoid elements is difficult. In contrast to this, nanostructures can carry metal-adsorbent compounds with a high density. Furthermore, nanostructures can stably carry metal-adsorbent compounds that adsorb lanthanoid elements and actinoid elements. Still furthermore, since reversible processes involving the ions are not affected by the carrying of the metal-adsorbent compounds, nanostructures that carry metal-adsorbent compounds can be reused.

Advantageous Effects of Invention

With the present invention, metal-adsorbent compounds are carried on the surfaces and inner walls of pores present in nanostructures having a large surface area and a highly-ordered structure, ensuring that target metal ions easily and quickly adsorb to the reaction groups of the metal-adsorbent compounds. This means not only a fast adsorption response but also much higher efficiency with which adsorption happens to the metal-adsorbent compounds as compared to the use of metal-adsorbent compounds alone, all of which means an increased amount of adsorbed metals. Furthermore, since the metals adsorb to the metal-adsorbent compounds in an orderly and dense manner, the adsorbed metals (ions) can be easily and quickly separated. This means a very high separation efficiency of the adsorbed metals (ions). Still furthermore, the metal-adsorbent compounds can be made to selectively adsorb greater quantities of specific metals by adjusting, for example, the pH value of the metal-dissolved solution, allowing specific metals to be efficiently recovered. For example, one embodiment of the present invention that uses mesoporous silica carrying aromatic azo compounds is capable of separating lanthanoid elements from actinoid elements, which previously had been difficult to do due to their similar chemical properties. Because actinoid elements coexist with lanthanoid elements in rare earth minerals as radioactive elements, which impede the effective use of rare earth metals and rare earth compounds, the present invention can be used to selectively separate and remove actinoid elements, allowing the effective use of rare earth minerals.

Mesoporous silica, nanotubes and nanorods, which are examples of nanostructures, are known for their robust skeleton, which hardly undergoes any change even when carrying metal-adsorbent compounds or adsorbed metal ions. The adsorbed metals can also be removed completely, thus returning the nanostructures to their original state (the state where metal-adsorbent compounds are being carried without any adsorbed metals) and allowing the nanostructures carrying the metal-adsorbent compounds to be reused and thus reducing the cost of metal recovery. For example, one embodiment of the present invention uses mesoporous silica that carries aromatic azo compounds. This embodiment can adsorb, separate and recover lanthanoid elements and actinoid elements as target metals. Aromatic azo compounds, which are used as a solid adsorption material with the present invention, not only realizes ion adsorption of lanthanoid elements faster and with high adsorption capacity than the prior art but because of the stable way in which the aromatic azo compounds are carried by mesoporous silica, degradation is kept to a minimum, and the aromatic azo compounds can be repeatedly used for extraction and back-extraction. Because of this, the cost of recovery of lanthanoid elements can be dramatically lower than the prior art.

DESCRIPTION OF EMBODIMENTS

Figure 1:
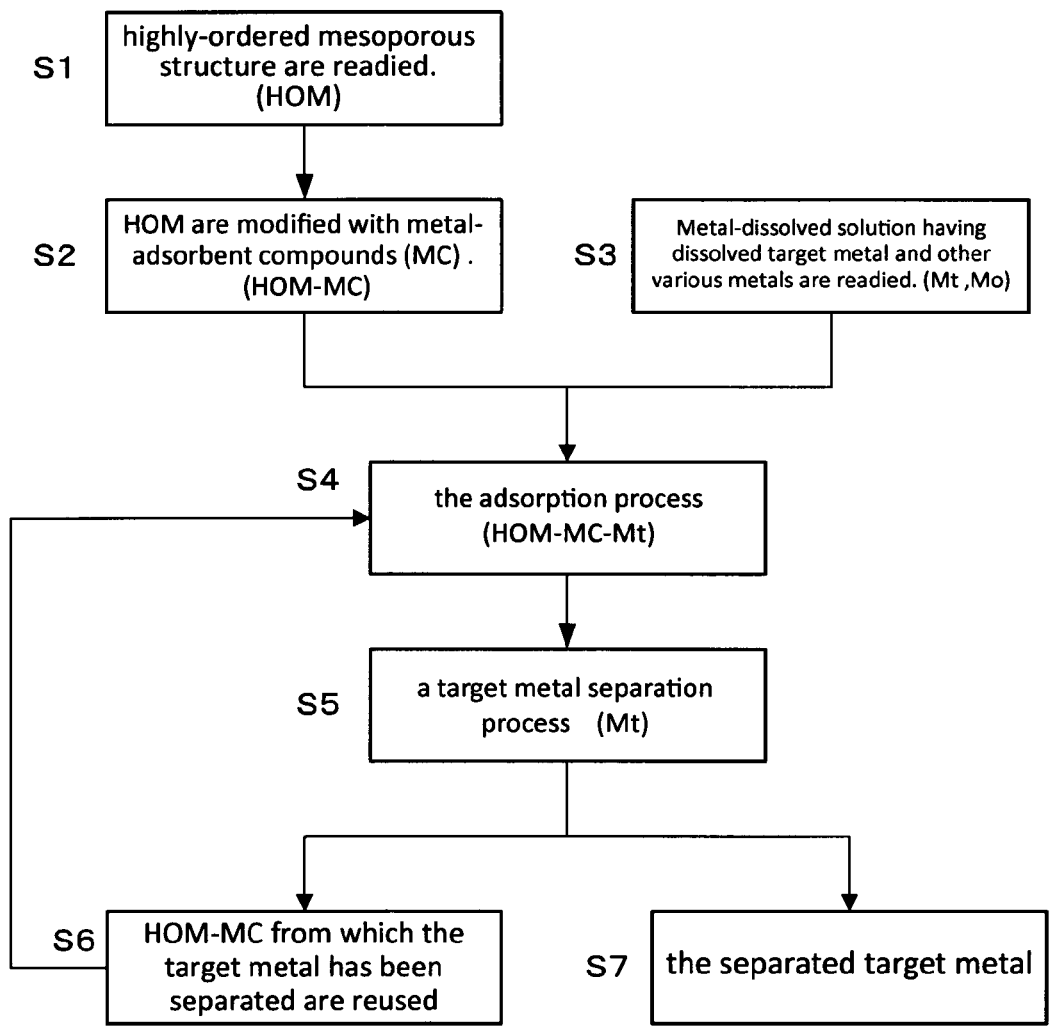
FIG. 1 shows a flowchart for the extraction method according to the present invention.
Figure 2:
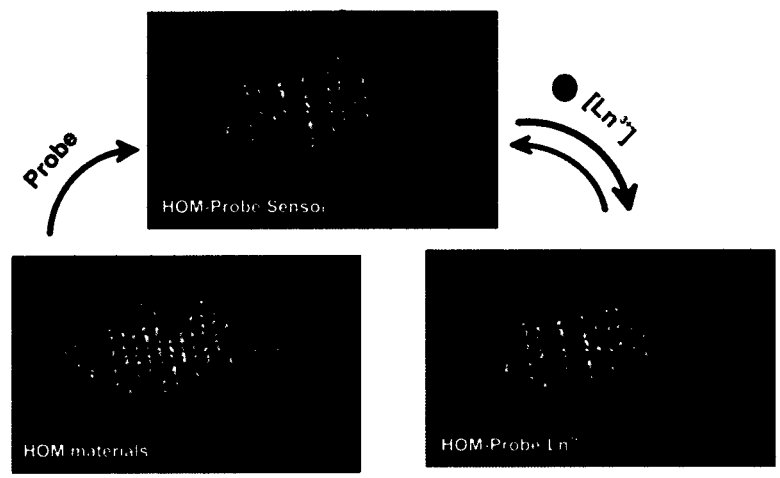
FIG. 2 shows the state of HOM surface.

Embodiments of the present invention are described next. FIG. 1 shows one example of a flowchart showing an overview of the extraction and separation method according to the present invention. FIG. 2 shows a schematic view of the surface state of a HOM. The general flow is explained first and is followed by a more detailed description of each step. As used in this specification, the term "target metal" refers to the metal that is to be separated from a metal-dissolved solution and includes its ions. A target metal is not confined to just one type of an element, and one type of HOM-MC can be used to separate a plurality of target metals from a solution if a plurality of elements is desired either simultaneously or sequentially.

With the extraction and separation method according to the present invention, nanostructures (e.g., highly-ordered mesoporous structure (HOM)) are readied (S1: lower left figure in FIG. 2). The nanostructures (HOM) are modified with metal-adsorbent compounds (MC) to obtain nanostructures (HOM-MC) that carry metal-adsorbent compounds (S2: top figure in FIG. 2). Metal-dissolved solution having dissolved target metal (Mt) and other various metals (Mo) are readied (S3). As the adsorption process, the nanostructures (HOM-MC) carrying the metal-adsorbent compounds are brought into contact with the metal-dissolved solution. This contact creates the state (HOM-MC-Mt) where target metal (Mt) ions are adsorbed to the HOM-MC (S4: lower right figure in FIG. 2). As elaborated further below, by adjusting the pH value, solution concentration, solution temperature and the like of the metal-dissolved solution during the step (S3) of preparing the metal-dissolved solution or the adsorption process (S4), target metal (Mt) ions can be efficiently, preferentially and selectively adsorbed. However, there are cases where other metals (Mo) other than the target metal are adsorbed (HOM-MC-Mt-Mo). If this happens, it is desirable to subsequently separate other metals (Mo) other than the target metal (Mt) from the nanostructures (HOM-MC-Mt-Mo) to create a state (HOM-MC-Mt) where substantially only the target metal is adsorbed to the metal-adsorbent compounds. As a target metal separation process, the target metal (Mt) is separated from the nanostructures (HOM-MC-Mt) that carry the metal-adsorbent compounds to which the target metal is adsorbed (S5). The nanostructures (HOM-MC) from which the target metal has been separated are reused for the adsorption process (S6: top figure in FIG. 2), and the separated target metal (Mt) is obtained (S7).

The nanostructures according to the present invention are particles having a fine structure (typically a size of 1 micron or less). The nanostructures can be porous structures having fine holes, nanorod structures having a fine rod-shape, and the like. Porous structures include mesoporous structures and nanotube structures and are preferably highly ordered. Ordinarily, the term "mesoporous structure" refers to substantially uniform and orderly arrangement of pores (mesopores) having a diameter of 2 to 50 nm that are found in a region referred to as a mesopore region. However, with the present specification, the term "mesoporous structure" includes micropores (pores smaller than 2 nm), which are smaller than mesopores, and macropores (pores larger than 50 nm), which are larger than mesopores. It is particularly desirable for porous structures according to the present invention to be highly ordered mesoporous (highly-ordered mesoporous ("HOM")) structures. Depending on the manufacturing method, the spatial symmetry of the network of pores and other factors, porous structures can have a variety of properties. As materials to be used as a mesoporous structure, it is desirable for the material to be an inorganic compound. The use of silica is particularly desirable, but metal oxides such as titanium oxide, aluminum oxide, zinc oxide and nickel oxide can be used as well. Mixtures of silica and metal oxides as well as mixtures of a plurality of metal oxides can also be used. Silica having a mesoporous structure is referred to as mesoporous silica. According to the present specification, porous silica includes those having pores of a diameter no larger than 2 nm and a diameter no smaller than 50 nm. Nanotube structures can also be used as the porous structures. The material used for the nanotube structures are desirably an inorganic compound, but carbon and metal oxides such as titanium oxide, aluminum oxide, zinc oxide and nickel oxide can be used as well. Mixtures of carbon and metal oxides, and mixtures featuring a plurality of metal oxides can also be used. The higher the BET specific surface area of the nanotubes structures, the better it is. However, it is preferable for the BET specific surface area to be 50 m$^2$/g or more, more preferably 100 m$^2$/g or more, and even more preferably 150 m$^2$/g or more.

Nanorod structures can also be used as the nanostructures. Nanorod structures are rod-shaped or needle-shaped structures of substantially uniform and orderly arrangement and having a diameter of several nm to several dozen nm and are preferably made of an inorganic compound. The material that is used to make the nanorods is a metal whose primarily component is at least one element selected from a group including Au, Ag, Cu, Pt, Al, Ni, Mo, W, Ti, Si and the like, or metal oxides such as titanium oxide, aluminum oxide, zinc oxide, tungsten oxide, zirconium oxide and the like. The nanorod structure can also be a thin-film featuring a sheet of a metal or a metal oxide having an array of perpendicular nanorod structures that are erected on the surface. The higher the BET specific surface area of the nanorod structures, the better it is. However, it is preferable for the BET specific surface area to be 100 $m^2/g$ or more, more preferably 200 $m^2/g$ or more, and even more preferably 800 $m^2/g$ or more.

Porous structures that are used with the present invention may be in the form of a thin film or a monolith. The term "form of a monolith" refers to all forms other than the usual thin films and includes forms such as particles, fine particles and blocks. The term "highly-ordered" refers to an orderly 3-dimensional arrangement of mesoporous structures on the surfaces and inner wall surfaces with a high degree of symmetry as in cubic crystal structures and hexagonal crystal systems. Examples of crystal structures include Ia3d, Pm3n and Fm3m as cubic crystal structures and P6m as a hexagonal crystal structure. The presence of these structures over a large region means that large amounts of metal-adsorbent compounds can be carried and also increases the amount of metal adsorption. It is desirable for the crystal structure of the mesoporous structures to be optimized to match the metal-adsorbent compounds that are carried. However, the coexistence of mesoporous structures having a structure other than the optimum crystal structure will decrease the efficiency but will not prevent the separation and extraction method according to the present invention from being practiced. The higher the BET specific surface area of the HOM, the better it is. However, it is preferable for the BET specific surface area to be 500 $m^2/g$ or more, more preferably 640 $m^2/g$ or more, and even more preferably 800 $m^2/g$ or more.

HOM can be synthesized in a number of ways (e.g., Patent Literature 3). For example, with a sol-gel method that uses surfactants as a template, when surfactants are dissolved in a solution in concentrations higher than the critical micelle concentration, micelle particles of a certain size and structure are formed depending on the type of surfactant. When the solution is left standing for some time, the micelle particles assume a packed structure and form colloid crystals. To synthesize porous silica, an organic silicon compound and the like that can serve as a source of silica is added to the solution. When a small amount of an acid or base is added to serve as a catalyst, a sol-gel reaction proceeds in the space between the colloid particles, forming a silica gel skeleton. When calcination is performed at the end at a high temperature, the surfactants that were used as templates decompose and are eliminated, leaving behind pure mesoporous silica. Also, preferably, organic silicon compounds are mixed with surfactants to form a lyotropic liquid crystal phase to which an acid aqueous solution is added to quickly cause a hydrolytic reaction of the organic silicon compounds to create integrated products of mesoporous silica and surfactants. The surfactants are later removed to obtain a HOM.

Examples of organic silicon compounds that can be used include silicon alkoxides such as TEOS (tetraethoxysilane), TMOS (tetramethoxysilane), tetramethyl orthosilicate ($C_4H_{12}O_4Si$) and tetraethyl orthosilicate ($C_8H_{20}O_4Si$). In the synthesis of HOM, TMOS is more preferable than TEOS in terms of productivity since methanol is easier than ethanol to remove from the generated product. Instead of using organic silicon compounds for the formation of HOM, inorganic silicon compounds can also be used such as kanemite ($NaHSi_2O_5 \cdot 3H_2O$), disodium silicate crystal ($Na_2Si_2O_5$), makatite ($NaHSi_4O_9 \cdot 5H_2O$), ilerite ($NaHSi_8O_{17} \cdot XH_2O$), magadiite ($Na_2HSi_{14}O_{29} \cdot XH_2O$), Kenyaite ($Na_2HSi_{20}O_{41} \cdot XH_2O$), water glass (sodium silicate), glass and amorphous sodium silicate. Two or more of these compounds can also be mixed and used.

A variety of surfactants can also be used as templates such as cationic, anionic, dipolar or nonionic surfactants. Examples of cationic surfactants that can be used as templates include primary amine salt, secondary amine salt, tertiary amine salt and quaternary ammonium salt. Examples of anionic surfactants that can be used as templates include carboxylate, sulfuric acid ester salts, sulfonate and phosphoric acid ester salt. Such examples include soap, fatty alcohol sulfuric acid ester salt, fatty alkyl ether sulfuric acid ester salt, sulfonated oil, sulfated fatty acid ester, sulfated olefin, alkylbenzene sulfonate, alkylnaphthalene sulfonate, paraffin sulfonate and fatty alcohol phosphoric acid ester salt. Examples of dipolar surfactants that can serve as templates include sodium lauryl aminoproprionate, stearyl dimethyl betaine, and lauryl dihydroxyethyl betaine. Examples of nonionic surfactants that can serve as templates include ether types such as polyoxyethylene alkyl ether, polyoxyethylene secondary alcohol ether, polyoxyethylene alkyl phenyl ether, polyoxyethylene sterol ether, polyoxyethylene lanolin acid derivatives, polyoxyethylene polyoxypropyrene alkyl ether, polypropyrene glycol and polyethylene glycol and nitrogen-containing types such as polyoxyethylene alkyl amine. Two or more of these compounds can be mixed and used as well.

Since the structure (size and shape of pores, crystal structure, etc.) of the HOM can be controlled by changing the type of surfactant, it is preferable to use surfactants that are capable of forming HOM with a highly ordered crystal structure, a high BET specific surface area and a high pore density. Examples of such surfactants include Brij (registered trademark) type ($C_xEO_y$), Triton (registered trademark) type (polyoxyethylene-p-isooctylphenol), Tween (registered trademark) type nonionic surfactants, cationic surfactants such as alkyl trimethylammonium bromide or chloride ($C_n$TMA-Br or -Cl, n=12, 14, 16 and 18), and triblock copolymer surfactants such as Pluronic (registered trademark) type ($EO_mPO_nEO_m$: poly(ethylene oxide)-poly(propyrene oxide)-poly(ethylene oxide)). The Brij type ($C_xEO_y$) has alkyl groups ($C_x$: $C_xH_{2x+1}$ or $C_xH_{2x-1}$) that become hydrophobic groups and poly(ethylene oxide) group ($EO_y$: —($CH_2$—$CH_2O)_y$—) that becomes hydrophilic groups. Specific examples include polyoxyethylene (10) cetyl ether (Brij (registered trademark) 56: $C_{16}H_{33}(OCH_2CH_2)_{10}OH$, M. av=683), polyoxyethylene (10) lauryl ether ($C_{12}EO_{10}$, $C_{12}H_{25}(OCH_2CH_2)_{10}OH$, M. av=626), polyoxyethylene (9) lauryl ether ($C_{12}EO_9$, $C_{12}H_{25}(OCH_2CH_2)_9OH$, M. av=582), polyoxyethylene (10) stearyl ether (Brij (registered trademark) 78, $C_{18}H_{35}(OCH_2CH_2)_{20}OH$, M. av=1152), polyoxyethylene (10) oleyl ether (Brij (registered trademark) 97, $C_{18}H_{35}(OCH_2CH_2)_{10}OH$, M. av=709), polyoxyethylene (20) oleyl ether (Brij (registered trademark) 98, $C_{18}H_{35}(OCH_2CH_2)_{20}OH$, M. av=1150), polyoxyethylene (23) lauryl ether (Brij (registered trademark) 35, $C_{12}H_{25}(OCH_2CH_2)_{23}OH$, M. av=1198) and polyoxyethylene (20) cetyl ether (Brij (registered trademark) 58, $C_{16}H_{33}(OCH_2CH_2)_{20}OH$, M. av=1124) and the like. Examples of nonionic surfactants of the Triton type or the Tween type include polyoxyethylene (10) isooctyl phenyl ether (Triton (registered trademark) X-100 (4-($C_8H_{17}$) $C_6H_4(OCH_2CH_2)_{10}OH$, M. av=625), polyoxyethylene (8) isooctyl phenyl ether (Triton (registered trademark) X-114 (4-($C_8H_{17}$) $C_6H_4(OCH_2CH_2)_8OH$, M.

av=427) and sorbitan polyoxyethylene (20) isooctylphenyl ether monostearate (Tween (registered trademark) 60, M. av=1312). Examples of cationic surfactants that can be used include n-dodecyl trimethyl ammonium bromide or chloride (($CH_3(CH_2)_{11}N(CH_3)_3$)Br/Cl), n-tetradodecyl trimethyl ammonium bromide or chloride (($CH_3(CH_2)_{13}N(CH_3)_3$)Br/Cl), n-hexadodecyl trimethyl ammonium bromide or chloride (($CH_3(CH_2)_{15}N(CH_3)_3$)Br/Cl) and n-stearyl trimethylammonium chloride or bromide (($CH_3(CH_2)_{17}N(CH_3)_3$)Br/Cl). Examples of triblock copolymer surfactants include Pluronic (registered trademark) P123: $HO(CH_2CH_2O)_{20}(CH_2CH(CH_3)O)_{70}(CH_2CH_2O)_{20}H$: $EO_{20}PO_{70}EO_{20}$, Pluronic (registered trademark) F68(($HO(CH_2CH_2O)_{80}(CH_2CH(CH_3)O)_{27}(HO(CH_2CH_2O)_{80}$: $EO_{80}PO_{27}EO_{80}$), Pluronic (registered trademark) L121 (($HO(CH_2CH_2O)_5(CH_2CH(CH_3)O)_{70}(HO(CH_2CH_2O)_5$: $EO_5PO_{70}EO_5$) and Pluronic (registered trademark) F108: $HO(CH_2CH_2O)_{141}(CH_2CH(CH_3)O)_{44}(CH_2CH_2O)_{141}H$: $EO_{141}PO_{44}O141$). A cubic crystal structure Pm3n (HOM-9) was obtained using a mixture with a weight ratio of Brij 56:TMOS=0.5. A cubic crystal structure Ia3d (HOM-5) was obtained using a mixture with a weight ratio of P123:TMOS=0.75. A cage-like silica structure with a cubic crystal structure Im3m (HOM-1) was obtained using a mixture with a weight ratio of F108:TMOS=0.7. Even though the carrying supporting body is mesoporous silica that uses only silica, other supporting bodies capable of carrying the desired complex-forming molecules may be used such as metal compound mesoporous powders that create similar mesoporous structures using other oxides. (These are included as HOM as well.)

In the second stage (S2) shown in FIG. 1, metal-adsorbent compounds ("MC") are carried by nanostructures such as HOM to obtain nanostructures ("HOM-MC") with adsorbed metal-adsorbent compounds. The top figure in FIG. 2 shows a schematic view of a HOM-MC. No metals are adsorbed yet to the metal-adsorbent compounds at this stage. The metal-adsorbent compounds are compounds that selectively adsorb specific metal ions. Examples of metal-adsorbent compounds that are used with the present invention include metal complexes, inorganic metal compounds and organic metal compounds. Metal-adsorbent compounds such as cellulose and protein are also included. Examples of metal complexes include inorganic and organic metal complexes, metal carbonyl compounds, metal clusters and organic metal compounds. Chelate compounds are also included. Basically, these are compounds that adsorb metal (ions), can be held by nanostructures (also referred to as modification or functionalization) and later allow the separation of target metals. It is also preferable if metal ions other than the target metal can be separated by a chemical process.

Figure 5:
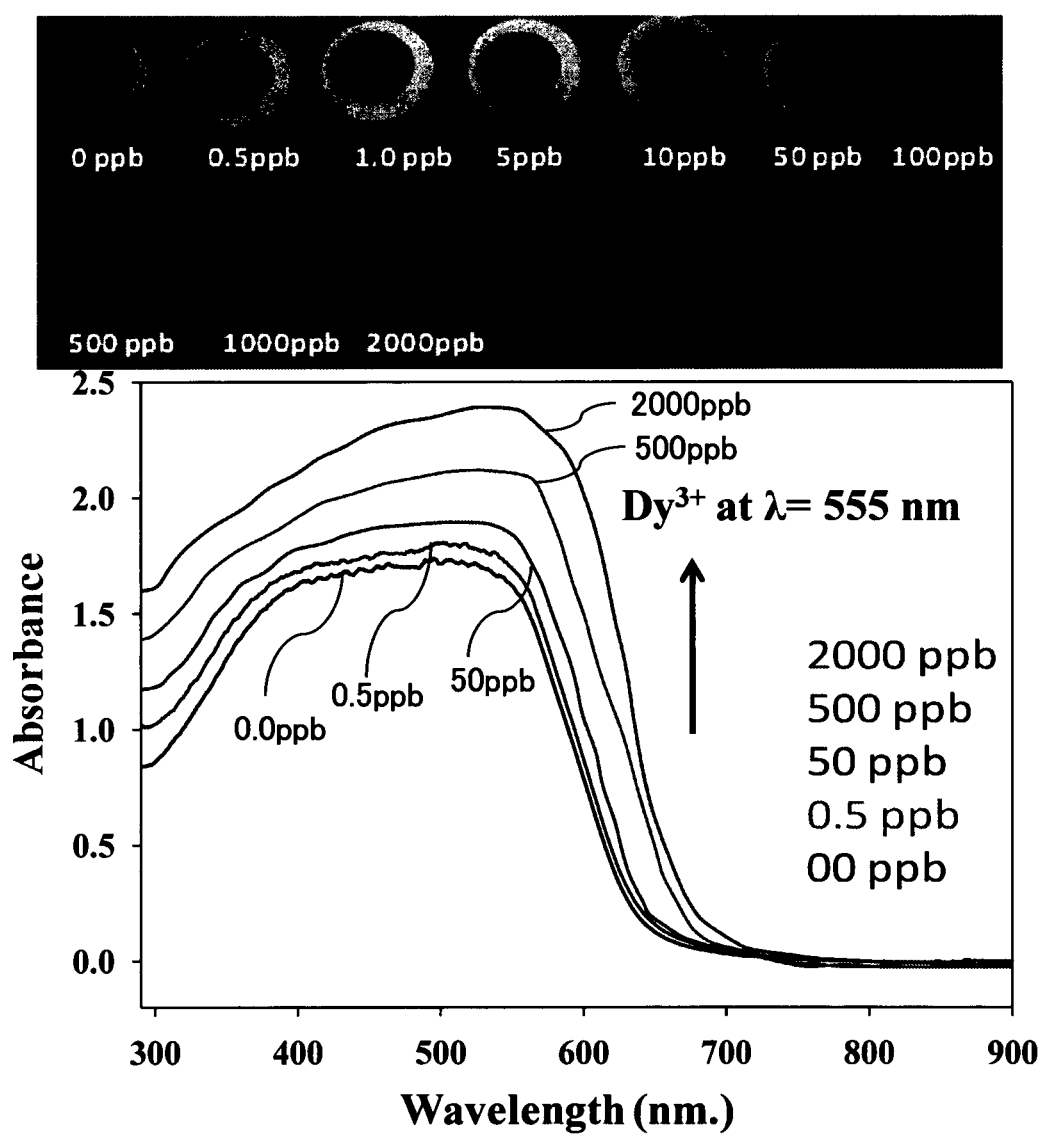
FIG. 5 shows the measured color reaction and UV-vis spectroscopy obtained with a DTAR-modified HOM using lanthanoid ion element concentration as a measurement parameter.

It is desirable for the metal-adsorbent compounds to be able to selectively and preferentially adsorb large amounts of the target metal to be recovered. If the target metals are lanthanoid elements or actinoid elements, it is preferable for the metal-adsorbent compounds whose target metals are lanthanoid elements or actinoid elements to be organic compounds (colorant precipitants) having a selective signal effect to lanthanoid elements and actinoid elements. Examples of such organic colorant precipitants include azo dyes, carbonyl dyes, phthalocyanine dyes, allyl carbonium dyes, sulfur dyes, methane dyes, nitro dyes or β-diketone resin. Because organic compounds with selective spectroscopic properties are organic compounds that exhibit a color reaction to a target metal of lanthanoid elements and actinoid elements, color reaction tests where the concentration is changed as shown in FIG. 5 and further discussed below can be used to easily select a metal-adsorbent compound.

Figure 3:
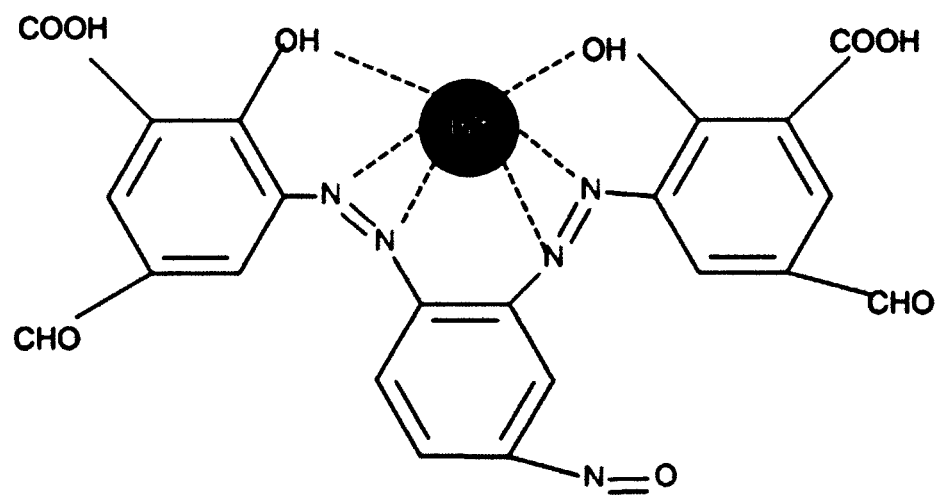
FIG. 3 shows a schematic representation using structural formulas of how metal complexes are formed by coordinate bonds between an aromatic azo compound and a lanthanoid element (Ln).

FIG. 3 schematically shows how metal complexes are formed by coordinate bonds with a lanthanoid element (Ln). Depending on the combination of the type of molecules and environmental control such as the pH of the solution, aromatic azo compounds selectively adsorb to some of the lanthanoid elements and actinoid elements, forming a metal complex as shown in FIG. 3. To explain, by carrying the aromatic azo compounds on a HOM, a solid adsorption material with a high selectivity and good adsorption is obtained for the adsorption and separation of lanthanoid elements and actinoid elements. An azo compound is an organic compound (R—N=N—R') wherein two organic groups (R, R') are bonded to an azo group (—N=N—) as shown in FIG. 3. An aromatic azo compound is an azo compound wherein at least one of either R or R' is an aromatic group (cyclic unsaturated organic compound). An amine compound is an organic compound with an amine (one, two or three of the hydrogen atoms in ammonia being replaced by an organic group (R, R' or R")). An aromatic amine compound is an amine compound wherein at least one of the organic groups (R, R' or R") is an aromatic group (cyclic unsaturated organic compound).

Figure 4:
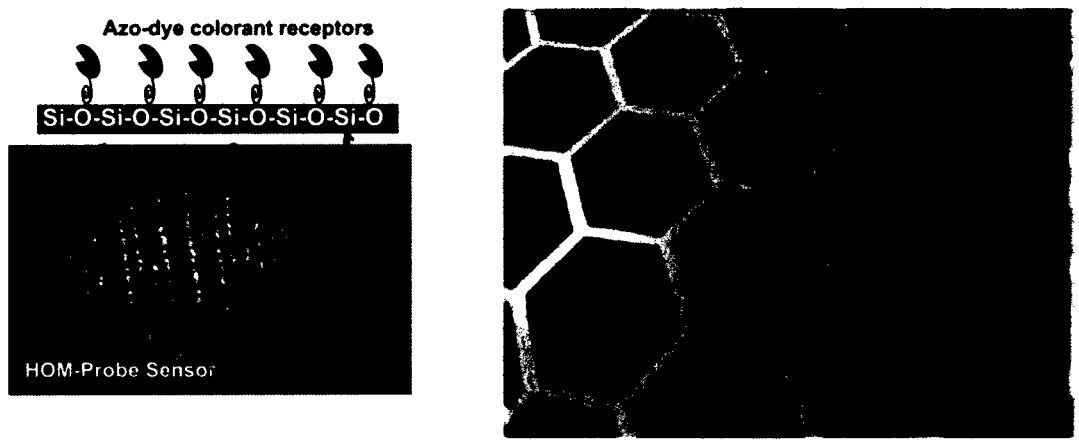
FIG. 4 shows a conceptual view of a highly ordered mesoporous silica (HOM) carrying complex-forming molecules of aromatic azo compounds serving as adsorption/separation/recovery material.

FIG. 4 shows a conceptual view of the structure of a highly ordered mesoporous silica (HOM) that carries complex-forming molecules of an aromatic azo compound as the adsorption/separation/recovery material. As FIG. 4 shows, the HOM is a silicon oxide having an orderly arrangement of pores (meso) whose diameter is in the order of several nm to several dozen nm. The aromatic azo molecules are carried on the inner walls of these pores, which are arranged in an orderly manner. As a representative example, FIG. 4 shows a honeycomb structure, but other structures can be used as well. The aromatic azo compounds that are carried have a fixed part that is located on the side of the HOM and an active part on the solution side. Functional groups having a selective adsorption to target metals of lanthanoid elements and actinoid elements are situated on the active part. The method of carrying the aromatic azo compounds can be by physisorption, chemisorption or the like. As for the fixed part, in addition to a direct fixing method, an intermediary substance such as surfactants that causes chemisorption can be used to avoid affecting the adsorption reaction. If nanorods are used as the nanostructures, the metal-adsorbent compounds are mainly carried on the side surfaces of the rod-shaped nanorods.

Complex-forming molecules of nitrogen-containing aromatic compounds are selected from those having selective spectroscopic properties to target metals of lanthanoid elements and actinoid elements. Examples of complex-forming molecules of nitrogen-containing aromatic compounds having selective spectroscopic properties to lanthanoids and actinoids include, among azo compounds, 3-(5-bromo-2-pyridylazo)-5-(diethylamino)phenol (3,5-diBr-PADAP) for dysprosium (Dy (III)) and uranium (U (IV)), (5-bromo-2-pyridylazo)-5-(diethylamino)phenol (5-Br-PADAP) for yttrium (Y (III)), cerium (Ce (III)) and lanthanum (La (III)), 3-(2-pyridylazo) for uranium (U (IV)), 4-(2-pyridylazo) resorcinol (PAR) for thorium (Th (IV)) and Europium (Eu (III)), 1-(2-pyridylazo)-2-naphtol (PAN) for Samarium (Sm (III)), lanthanum (La (III)) and cerium (Ce (III)), and 4-(2-pyridylazo) resorcinol for dysprosium (Dy (III)), holmium (Ho (III)), thorium (Th (IV)) and dysprosium (Dy (III)). Furthermore, other azo aromatic groups that can be used include 4-(2-thiazylazo) 6-dodecylresorcinol (DTAR), 4-(2-pyridylazo) N,N-dimethylaniline (PADA), 5-methyl-4-(2-thiazolylazo) resorcinol (5-Me-TAR) and 2-(4-diethylamino-2-hydroxyphenylazo)-5-bromopyridine (DAH). Examples of amines include 2-aminophenol, 2-aminothiophenol and 2-aminobenzothiazole for lanthanum (La (III)), Europium (Eu (III)), ytterbium (Yb (III)), cerium (Ce (III)), praseodymium (Pr (III)), Neodymium (Nd (III)), gadolinium (Gd (III)), dysprosium (Dy (III)), holmium (Ho (III)) and erbium (Er (III)). Furthermore, examples of compounds that interact with lanthanoid metals and actinoid metals and cause a fluorescence quenching reaction include $N^2,N^6$-diethanamine purine (DEAP), N,N'bis(3-carboxysalicylidine) 3,4 diaminobenzoic acid (CSBA), N,N'bis(salicylidine) 2-mercaptopyriminidin-4-ol-5,6 diamine (CMPA), N,N'disalicylidene-4-carboxy-phenylenediamine (SCPD) and N,N'disalicylidene-4-nitro-phenylenediamine (DSNPD). Furthermore, other nitrogen-containing aromatic compounds include N,N,N,N-tetrabutylmalonamide (TBMA) for ytterbium (Yb (III)) and 2-nitroso-1-naphthol for Europium (Eu (III)) and Samarium (Sm (III)). (However, to adsorb Samarium (SM(III)) using 2-nitroso-1-naphthol, since 2-nitroso-1-naphthol preferentially adsorbs to Co (II), the adsorption step must be performed after eliminating Co (II) from the metal-dissolved solution.)

As for substances that can be used as metal-adsorbent compounds that are carried by a HOM, in addition to the substances that are known from traditional selection spectroscopy, metal-adsorbent compounds that are not described in previous literature, especially aromatic azo substances and aromatic amine substances, can be carried on a HOM and used. In this case, the UV-vis spectroscopic property with a concentration dependence can be checked against regions of low concentration of the target lanthanoid elements and actinoid elements as shown in FIG. 5. To explain, colorants that are candidates as metal-adsorbent compounds are prepared, and UV-vis spectroscopy for lanthanoid elements and actinoid elements is performed using element concentration as a parameter as shown in FIG. 5. If the UV-vis spectroscopy of a colorant exhibits a concentration dependence on any of the lanthanoid elements or actinoid elements, the colorant is selected as the metal-adsorbent compound where the target metal is the lanthanoid element or actinoid element to which there is concentration dependence. Furthermore, it is preferable to perform the UV-vis spectroscopy of the selected colorant using pH of the solution containing the target metal ions as a parameter and to select the conditions to be used for the extraction process. Then, the nanostructures are modified using the colorant as the metal-adsorbent compound and are brought into contact with a metal-dissolved solution to extract the target metal ions.

If the target metal is a metallic element other than a lanthanoid element or an actinoid element, chelate compounds that selectively bond with various metals can be used as a metal-adsorbent compound. For example, ethylenediamine tetraacetic acid (EDTA: $C_{10}H_{16}N_2O_8$) selectively adsorbs to $Ca^{2+}$, $Cu^{2+}$, $Fe^{3+}$ and the like. Other examples include dithizone (Cu, Zn, Ag, Hg, Pb), cupferron (Ti, Fe, Cu), quinaldic acid (Cu, Zn, Cd), α-nitroso-β-naphthol (Co, Pd) and dimethylglyoxime (Ni, Pd). Examples of a chelate resin, which is a polymer of a chelate compound, include carboxylic acid-type resin (Cu, Ni, Zn), polyamine-type resin (Hg, Cd, Cu), polyimine-type type resin (Hg), thiol-type resin (Ag, Hg, Au), hydroxyl-type resin (Mo, V) and aso-type resin (Cu, La, Zr, Pd). Chitosan (($C_6H_{11}NO_4$) n) also exhibits metal adsorption selectivity (Fe, In, Ni, Cd, Zn). (Metals that are selectively adsorbed are identified within the parentheses.) By adjusting the pH value, temperature, concentration and the like of the metal-dissolved solution in which various metals are dissolved, specific metals can be made to be selectively adsorbed by the metal-adsorbent compound. Also, since chelate compounds are capable of selectively adsorbing extremely small quantities (e.g., in the ppb order) of metals, target metals are efficiently and selectively adsorbed even when the amount of the target metal contained in the metal-dissolved solution is small.

Various methods are available for modifying (also called complex-formation) HOM to carry metal-adsorbent compounds on the HOM. For example, if the metal-adsorbent compounds to be carried by the HOM is neutral, the reagent impregnation method (e.g., REACTIVE & FUNCTIONAL POLYMERS, 49, 189 (2001)) is used. If the metal-adsorbent compounds are anionic, the cation exchange method is used, and if the metal-adsorbent compounds are cationic, the anion exchange method is used. These hybridization methods are not special operations done under special conditions but are well-known technical methods. Hence, the details of these technical methods can be obtained by referring to general discussions and literature in the field of solid adsorption.

Examples of such methods include a method wherein the surface of mesoporous silica is treated with a cationic organic reagent (e.g., cationic silylating agent), cationic functional groups are then added to the mesoporous silica, and the cationic mesoporous silica is then brought into contact with an aqueous or alcohol solution of anionic metal-adsorbent compounds to cause the adsorption of the metal-adsorbent compounds inside the mesoporous silica. Another method involves bringing mesoporous silica into contact with an organic solvent of metal-adsorbent compounds, removing only the organic solvent by filtration or distillation to cause physical adsorption of the metal-adsorbent compounds inside the mesoporous silica. Another method involves treating the surface of mesoporous silica with a silylating agent having thiol groups, then oxidizing the thiol groups that are generated on the surface to add anionic functional groups to the mesoporous silica, and then bringing the anionic mesoporous silica into contact with a solution of cationic metal-adsorbent compounds to cause adsorption of the metal-adsorbent compounds inside the mesoporous silica. Another method involves filling the pores and surfaces with metal-adsorbent compounds in advance and then treating with an organic solvent of a cationic organic reagent to cause the metal-adsorbent compounds to be fixed within the pores and on the surface. Another method involves mixing metal-adsorbent compounds and a cationic organic reagent in advance, then bringing the organic solvent of the reagent complex into contact with silica, and removing only the organic solvent by filtration, distillation or the like to cause metal-adsorbent compounds to be carried within the silica.

Furthermore, the higher the orderliness of the crystal structure, the higher the porous density and the greater the BET specific surface area of the HOM and the greater the amount of metal-adsorbent compounds that are carried with orderliness on the surface and on the inner walls of the pores of the HOM. Preferably, metal-adsorbent compounds are adsorbed by a HOM on which cubic crystal structures such as Pm3n, Fm3m and Ia3d and hexagonal crystal structures such as P6m are extensively formed.

It is certainly possible to selectively adsorb the target metals using metal-adsorbent compounds alone. However, for reasons such as the agglomeration of the metal-adsorbent compounds, functional groups capable of metal adsorption cannot be effectively used. To explain, even if the target metal were to adsorb to the functional groups that are present on the surface of the agglomerated (and hence in the form of particles, for example) metal-adsorbent compounds, it is difficult for the target metals to adsorb to the functional groups that are present inside the metal-adsorbent compounds in the form of particles. Furthermore, even if the target metals were to successfully adsorb to the functional groups of the metal-adsorbent compounds that are present within the compound in the form of particles, it is difficult to remove the adsorbed metals.

In contrast to this, since mesoporous silica has a porous structure with extremely high surface area owing to its pores and a very well ordered orientation, metal-adsorbent compounds are bonded to the surfaces of the mesoporous silica and to the inner walls of its pores in a highly ordered arrangement. This translates to a very high metal adsorption rate by the metal-adsorbent compounds. Stated otherwise, a majority of the metal-adsorbent compounds is made available to adsorb the metals. Because a metal-dissolved solution or a filterating solution (back-extraction solution) easily and quickly penetrates into the surface and pores of mesoporous silica, the solution quickly and easily comes into contact with the metal-adsorbent compounds that are carried by the HOM. This means that when the HOM-MC comes into contact with a metal-dissolved solution, adsorption happens quickly. To separate (filter) the adsorbed metals, bringing into contact with the filterating solution will quickly separate (filter) the adsorbed metals, greatly increasing productivity.

For example, when a chelate resin is used alone, the atoms on the surface of the chelate resin will not all be effectively carrying a chelate (functional group). Instead, there will be discrete chelate reaction ends. When metal ions are adsorbed using only a chelate resin, it is not possible to control the location of the chelate resin where the adsorption takes place. Also, even though it is anticipated that metals will be adsorbed (also referred to as extraction) to the chelate functional groups that come into contact with the metal-dissolved solution, it is believed that hardly any adsorption of metals occurs within the chelate resin where the metal-dissolved solution does not penetrate easily. This means a very poor metal adsorption efficiency. Furthermore, during the release filtration (separation) (also known as back-extraction) of the metals (ions) that are adsorbed to the chelate resin, it is difficult to extract the metals that are adsorbed inside the chelate resin. If the same chelate resin is repeatedly reused, the effect of the residual substances and the like in the chelate resin will be to progressively worsen the metal extraction/back-extraction efficiency, and repeated reuse will greatly degrade the performance of the chelate resin. In contrast to this, HOMs that carry chelate resin will take advantage of the large specific surface area of the HOM and the orderly arrangement of the atoms to form chelate functional groups with a large effective reaction area on the surface of the HOM. Stated otherwise, the reactions ends of the chelate on the HOM will have substantially the same properties. Furthermore, large amounts of chelate reaction ends will be present on the surface of the HOM and on the inner walls of the pores in amounts that are not realized by previous methods where a chelate resin was used alone. Because the metal ions and chelated ions are selectively captured by the chelate functional groups, metal adsorption efficiency becomes extremely high. Furthermore, the captured metal ions and the chelates that contain the ions can be extracted by back-extraction. Furthermore, if a chelate resin is used alone, because of the insufficient physical and/or chemical strength of the resin itself, reuse causes significant degradation of the chelate resin. However, when the chelate resin is carried by a HOM, because HOM serving as the skeleton has sufficient physical and/or chemical strength, degradation due to reuse is minimal.

In stage 3 (S3) in FIG. 1, a solution (metal-dissolved solution) containing various dissolved metals from a mineral is prepared in advance, for example, in the following way. Materials including rare metals such as Co, In and Nb obtained from mobile telephones, personal computers and the like are immersed in a nitric acid solution to dissolve many metals such as Fe, Cu, Co and the like that are also included in the urban minerals. Solids are then removed from the solution to obtain a metal-dissolved solution. With lanthanoid elements and actinoid elements as well, a metal-dissolved solution is prepared wherein these elements, which are the target metals, have been ionized in advance by some chemical method (such as dissolving with an acid or the like). Fundamentally, it is not a problem if this solution contains ions of lanthanoid elements or actinoid elements that are not the target metals, or other metal ions. Even though there are exceptional cases where some metal ions are preferentially or simultaneously adsorbed with the target metals by the metal-adsorbent compounds and thus impede the selection and separation of the target metals, unless those exceptional metal ions ("interfering ions") are also lanthanoid elements or actinoid elements, this is not a problem so long as the interfering ions are removed from the metal-dissolved solution in advance using well-known traditional chemical processes such as precipitation and separation. Stated otherwise, a step for the removal of the interfering ions may be added to the stage (S4) for the preparation of the metal-dissolved solution. Still furthermore, a metal-dissolved solution can be prepared by the dissolution of not just urban minerals but natural minerals containing lanthanoid elements or actinoid elements.

Furthermore, it is preferable to prepare the metal-dissolved solution so as to create an environment where the selection and separation properties of the metal-adsorbent compounds can be more easily exhibited. One such preferential way is to pre-process the metal-dissolved solution to adjust its pH or otherwise perform a chemical process on it as a pre-process so as to precipitate metals other than the target metals, thereby reducing the amount of metals other than the target metals that are present in the metal-dissolved solution. Furthermore, among metal-adsorbent compounds, there are those whose selectivity and adsorption rate to interfering ions and target metal ions change depending on the pH value, solution concentration, solution temperature and the like, and target metals can be made to efficiently adsorb to the metal-adsorbent compound by adjusting the pH value, solution concentration, solution temperature and the like of the metal-dissolved solution. The most effective is the adjustment of the pH. Since, in a high pH solution, the target metal ions may be lost by precipitation as hydroxides, complex-forming molecules can be added to a solution of oxalic acid or the like to prevent the precipitation of the target metals in a high pH environment. During this adjustment stage, it is preferable to add additive molecules (pH adjustment agent, precipitation prevention agent and the like) that promote the ability to form metal complexes so as to promote the target metal separation reaction. However, this step of adjusting the environment is not indispensable. The adjustment need only be performed to the extent necessary as required by the elements used, purity and other conditions. To obtain elements of a high purity with one extraction/back-extraction process of a metal-dissolved solution containing interfering ions may require at times a rigorous adjustment of the metal-dissolved solution environment. However, if the coexistence of some amounts of impurities is tolerated or if interfering ions or impurities can be easily separated by some method, the adsorption process can be performed without any rigorous adjustment of the environment and with the environment adjusted only to the extent required for the adsorption of the target metals to the metal-adsorbent compounds. If the interfering ions can be easily separated from the lanthanoid elements or the actinoid elements that are the target metals, it may be more efficient to separate the interfering ions from the metal-dissolved solution or to separate the interfering ions from the back-extraction solution that is obtained by the back-extraction than to carry out a rigorous adjustment of the environment. Alternatively, it is also acceptable to perform an extraction process on the back-extraction solution containing interfering ions using a porous structure that carries some other metal-adsorbent compounds or to use a multi-stage extraction method. Even if a multi-stage extraction method is used, because the starting material is a back-extraction solution whose target metal concentration has been increased by HOM-MC, the time and cost incurred and the amount of waste solution that is generated are greatly reduced.

After the metal-dissolved solution is prepared, the HOM (i.e., the HOM-MC) carrying the metal-adsorbent compounds (MC) with a high density is, for example, immersed in the metal-dissolved solution in the adsorption step (S4) in FIG. 1 so as to bring the HOM-MC into contact with the metal-dissolved solution. This contact causes the adsorption of the metal ions by the HOM-MC. Because the metal-adsorbent compounds selectively or preferentially adsorbs the target metals under specific conditions (pH value, temperature, concentration, etc.), by immersing the metal-adsorbent compounds in a metal-dissolved solution having that specific condition, a HOM (i.e., a HOM-MC-MT) that has adsorbed only the target metals (Mt) is obtained. For example, by bringing a HOM-MC into contact (including immersion) with a metal-dissolved solution whose pH value has been adjusted for the best adsorption of the target metal ions, a large amount of the target metals is selectively adsorbed by the HOM-MC. However, slight fluctuations in the conditions can result in the HOM to adsorb the target metals (Mt) together with metals (Mo) other than the target metals, creating a HOM-MC-Mt-Mo. Because this stage involves the adsorption of the target metals (ions) by the HOM-MC, this stage can be referred to as the target metal (ion) adsorption step.

In the adsorption process, an adsorption/separation/recovery material (HOM-MC carrying azo complex-forming molecules) is brought into contact with the adjusted metal-dissolved solution so as to cause the adsorption of the lanthanoid elements or the actinoid elements that are the target metals by the functional groups of the metal-adsorbent compounds (azoaromatic group, etc.). Examples of the method of contact include immersion, passing through a column, mixing and stirring with adsorption/separation/collection material that is in a particle form and passing through a membrane. It is also possible to check the effectiveness of the contact by monitoring the color reaction caused by a selective signal effect or measuring the UV-vis spectroscopy while engaging in contact either continuously or intermittently to achieve an effective and efficient contact.

FIG. 5 shows UV-vis spectroscopy measured using lanthanoid ion element concentration (specifically $Dy^{3+}$) as a parameter for a HOM carrying DTAR (4-(2-thiazylazo) 6-dodecylresorcinol). In the spectra shown in FIG. 5 where the wavelength is between 350 nm and 650 nm, the bottom curve is the spectrum for the solution that contains no $Dy^{3+}$ (0 ppb). The top curve is the spectrum for a solution that contains 2000 ppb (2 ppm) of $Dy^{3+}$. It can be seen that absorbance increases with increased concentration of $Dy^{3+}$ in the solution, confirming the increased amount of dyes in the solution. The UV-vis spectroscopy obtained from similar experiments using HOM carrying organic compounds that exhibit no color reaction revealed no concentration dependence, indicating that the change in absorbance (change in dye concentration) correlates to the amount of $Dy^{3+}$ that is adsorbed. As FIG. 5 shows, by adsorbing the target metals while measuring the spectroscopic properties, it is possible to know the degree of absorption of the target metals by the HOM-MC and the approximate concentration.

Figure 7:
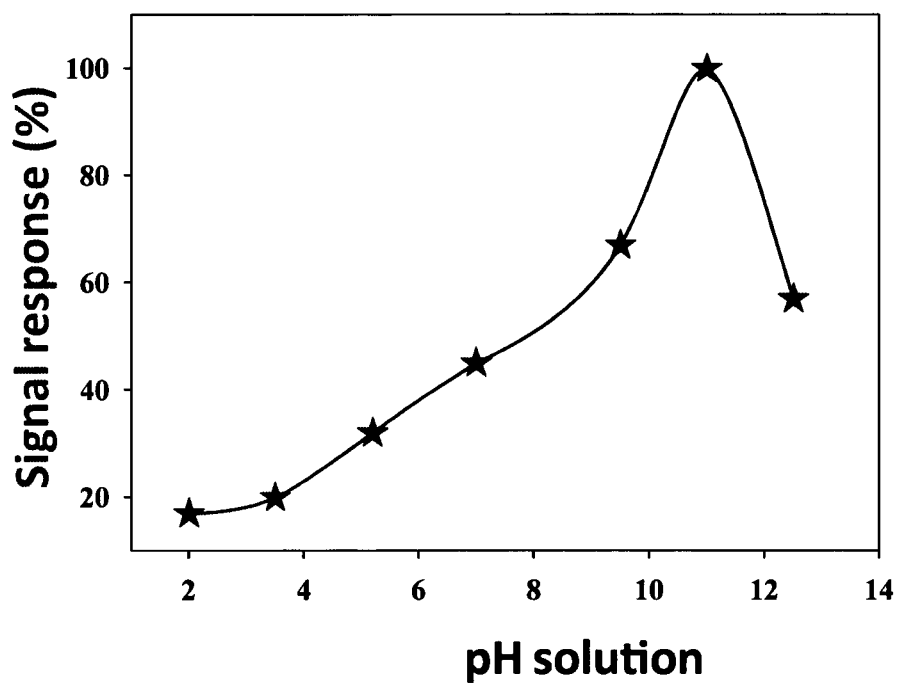
FIG. 7 shows UV-vis spectroscopy obtained with a DTAR-modified HOM using pH as a measurement parameter.

FIG. 7 shows the absorbance (relative value) of a DTAR-modified HOM-MC that was obtained by adding NaOH and 0.2M (mole) of $C_6H_{11}NHCH_2SO_3H$ to a solution featuring 2 ppm of dissolved Dy alone as a lanthanoid element to change the solution's pH. Since FIG. 5 shows that absorbance correlates to the Dy adsorption capacity, the UV-vis spectroscopy of FIG. 7 confirms that a pH of 11.0 is preferable when using DTAR as the metal-adsorbent compound and Dy as a target metal.

If interfering ions (Mo) are adsorbed as well in the adsorption process (S4), it is preferable to provide a non-target metal separation process involving the immersion of the HOM-MC-Mt-Mo in a solution that filters (separates) metals (Mo) other than the target metal so as to obtain HOM-MC-Mt that has substantially adsorbed only the target metal and from which metals (Mo) other than the target metal have been removed. Alternatively, conditions such as the pH value, temperature or solution concentration can be adjusted to obtain a HOM-MC-Mt from which metals (Mo) other than the target metals have been eliminated. If the amount of metals other than the target metal that is adsorbed is very limited in the adsorption process (S4) or if the interfering ions do not affect the use of the target metal or if a method is available for filtering just the target metal (Mt) in the target metal separation process (S5), it is not necessary to provide a non-target metal separation process.

For example, if a plurality of different solution conditions is available where the elements that are adsorbed differ depending on the condition, the adsorption-separation process can be repeated a plurality of times while changing the conditions of the metal-dissolved solution or the back-extraction solution to obtain the desired elements. For example, a HOM-MC can be immersed in a metal-dissolved solution having a first condition (the condition for adsorbing a plurality of elements) to adsorb Mt and Mo to the HOM-MC. Then, after separating the Mt and Mo into a first back-extraction solution, the back-extraction is adjusted to be in a second condition (the condition where only a single element is adsorbed), and the HOM-MC is immersed in it to cause the Mt to be adsorbed by the HOM-MC. By then separating the Mt into a second back-extraction solution, Mo is separated from the metal-dissolved solution into the first back-extraction solution and the Mt is separated into the second back-extraction solution. Alternatively, after immersing the HOM-MC in a metal-dissolved solution having a second condition (the condition where only a single element is adsorbed) and separating all the Mt that is present in the metal-dissolved solution into a first back-extraction solution, the metal-dissolved solution is set to a first condition (the condition for adsorbing a plurality of elements) and the HOM-MC is immersed in it. Since the Mt in the metal-dissolved solution had all been already separated, only the Mo is adsorbed, allowing the Mo to be separated into a second back-extraction solution. Here, even though Mt and Mo were differentiated for the sake of ease of explanation, in actual practice Mo becomes the second target metal.

With the target metal separation step (S5), HOM-MC-Mt or HOM-MC-Mt-Mo with target metal (Mt) adsorbed to it is immersed in a solution capable of dissolving the target metal to dissolve the target metal (Mt) into the solution. Alternatively, if conditions such as pH value, temperature and solution concentration can be adjusted so that only the target metals are filtered (separated), the HOM (HOM-MC-Mt or HOM-MC-Mt-Mo) with the target metal (Mt) adsorbed to it is immersed in a solution having that condition so that only the target metal Mt is dissolved in the solution. Alternatively, HOM (HOM-MC-Mt or HOM-MC-Mt-Mo) with adsorbed target metal (Mt) is immersed in a solution that filters (separates) only the target metal to dissolve the target metal (Mt). If one considers the process of adsorbing a target metal to HOM-MC and creating HOM-MC-Mt as the extraction of the target metal, because this process filters (separates) the Mt from HOM-MC-Mt or HOM-MC-Mt-Mo, this process can be said to be a back-extraction process or a target metal (ion) separation process. The solution with the dissolved target metal is referred to as the back-extraction solution. If the target metal alone can be filtered (separated), by repeating the extraction/back-extraction process starting from the metal-dissolved solution, the target metal in the metal-dissolved solution can be isolated into and concentrated in the back-extraction solution. From FIG. 7, because reducing the pH to less than 4 will reduce the Dy adsorption capacity of the DTAR-modified HOM-MC, back-extraction is performed simply by reducing the pH to less than 4.

Even with lanthanoid elements and actinoid elements, in the target metal separation process (S5), the adsorption/separation/recovery material (HOM carrying metal-adsorbent compounds) is removed from the metal-dissolved solution after being placed in contact with the metal-dissolved solution. The progress of the adsorption process can be monitored by monitoring the change in color reaction or by measuring the spectroscopic spectrum. The target metal separation process (S5) can also be performed by passing the metal-dissolved solution through a column or membrane comprising the adsorption/separation/recovery material. It is preferable to wash the removed adsorption/separation/recovery material as a step for eliminating the non-target metals. The adsorption/separation/recovery material is then brought into contact with the back-extraction solution. Just as with the afore-described contact with the processing solution, the contact with the back-extraction solution can be performed in a variety of ways. It is also possible to monitor the progress of the back-extraction by monitoring the change in color reaction or by measuring the spectroscopic spectrum. The back-extraction can be performed by changing the chemical atmosphere used in forming the complexes of the functional groups to a decomplexation chemical atmosphere. For example, even though the adjustment of the pH is the most representative method, it is acceptable to promote the reaction by performing the reaction in the presence of $NO_3^-$ ions, $SO_4^{2-}$ ions and the like.

Since the HOM-MC from which the target metal has been separated is a solid, the HOM-MC can be removed by filtration (S6). The HOM-MC can subsequently be reused for the extraction process after cleaning and removing the various solutions. By repeating this process, it is possible to selectively extract the target metal elements from the processing solutions into the back-extraction solution. Also since the metal ions that are extracted into the back-extraction solution are only the lanthanoid and actinoid ions that are the target metal ions, these ions can be recovered as oxides and hydroxides by solidification, precipitation and filtration using usual methods such as a chemical potential process (acidic or alkaline processing), electrolysis and the like (S7). In this way, with the extraction method according to the present invention, lanthanoid elements and actinoid elements are recovered as target metals from both natural minerals and urban minerals.

As afore-described, from a metal-dissolved solution with dissolved target metals obtained from natural minerals or urban minerals, target metals are recovered by means of at least the adsorption process (S4) and the target metal separation process (S5) using a highly-ordered HOM that carry metal-adsorbent compounds.

Embodiment 1

The present embodiment is an example of the use of a HOM modified with an azo reagent to recover one of the lanthanoid elements. The azo reagent that was used is DTAR (4-(2-thiazylazo)6-dodecylresorcinol). As comparison examples 1 and 2, a similar method of adsorption/separation/recovery was tried also using nitrogen-containing non-color reacting spectroscopic reagents (N,N'bis(salicylidene) dodecane-1,12-diamine (BSDD) and 2-hydroxy-3-((2-mercaptophenylimino)methyl)benzoic acid (HMPB)). "Non-color reacting spectroscopic reagent" refers to organic indicator dye reagents that do not exhibit a color reaction when interacting with lanthanoid elements or actinoid elements.

Figure 6:
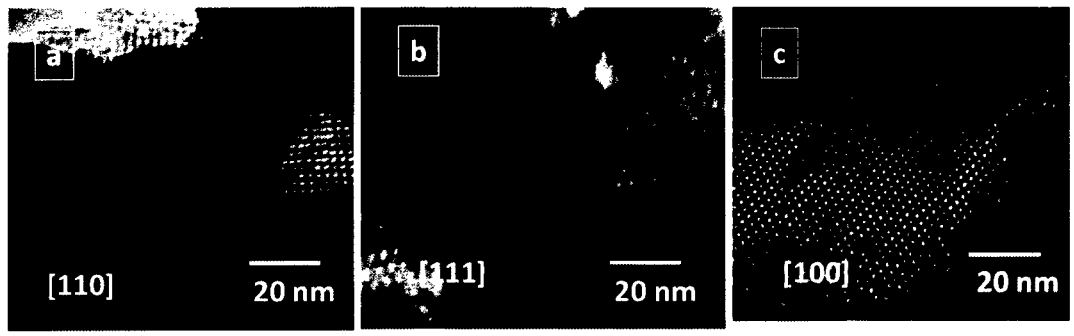
FIG. 6 shows transmission electron microscope (TEM) photos of HOM.

The HOM was obtained by mixing TMOS (tetramethoxysilane) and surfactant F108, which provides a template structure, at a ratio of 0.7 (TMOS) to 1 (surfactant F108). The solution was then heated to 50° C. to 60° C. and stirred for 1 to 2 minutes. This was followed by the addition of hydrochloric acid and a catalyst. The solution was then heated for 10 minutes under reduced pressure. FIG. 6 shows the TEM (transmission electron microscopy) photo of the HOM that was obtained. Based on these photos and the results of XRD (powder X-ray diffraction measurements), it was confirmed that the HOM has an Im3m cubic crystal structure. The associated BET specific surface area was 585 $m^2/g$, the diameter of the mesoporous pores was 16 nm, and the HOM density was 0.6 $cm^3/g$.

DTAR was synthesized as follows. 15 g (0.15 mol) of 2-aminothiazole was homogenously dissolved in 100 ml of 0.4M $H_2SO_4$ and cooled with ice for 1 hour while constantly stirring. When a homogenous mixture was obtained, 100 ml of 10.8 g (0.16 mol) sodium nitrite solution that was ice-cooled was added dropwise and was stirred for 2 hours at 0 to 2° C. Then, 41.8 g (0.15 mol) of 4-dodecylresorcinol, an amount to achieve an equimolar ratio, were dissolved in 50 ml of $C_2H_5OH$:(0.5%) NaOH=3:1 mixture solution. This was added to the solution that had been diazotized at 1° C. to 3° C. The coupling reaction is promoted when the pH of the solution is adjusted to 5.5 using 10% sodium acetate. When the mixture is stored under refrigeration, the desired product is obtained as an amorphous dark-orange precipitate having a reddish tint. After purification by a series of washing using hot and cold water, recrystallization was performed in 70% ethanol to obtain the DTAR (4-(2-thiazylazo)6-dodecylresorcinol).

The HOM was modified with the DTAR (4-(2-thiazylazo) 6-dodecylresorcinol) serving as the metal-adsorbent compound. The HOM was immersed in an ethanol solution of DTAR and then heated in a vacuum to produce the DTAR-modified HOM (HOM-MC). The afore-mentioned FIG. 5 shows the UV-vis spectroscopy of the HOM-MC. FIG. 5 shows photos (top portion of the figure) of the color reaction and the UV-vis spectroscopy that was obtained with a DTAR-modified HOM-MC when only $Dy^{3+}$ ions were added in different concentrations (0 ppb, 0.5 ppb, 1 ppb, 5 ppb, 10 ppb, 50 ppb, 100 ppb, 500 ppb, 1000 ppb (1 ppm) and 2000 ppb (2 ppm)) to a solution with a pH of 11.0 in an experiment to measure wavelength dependence of light absorbance. FIG. 5 shows a peak near a light wavelength of 585 nm with a significant concentration dependence, confirming the capturing of lanthanoid element (Dy) complexes by the HOM-MC. On the other hand, comparison examples 1 and 2, which used non-color reacting spectroscopic reagents, did not show such UV-vis spectroscopy even in other pH regions, confirming the efficacy of the DTAR modification of HOM. FIG. 7 shows the Dy adsorption capacity of the DTAR-modified HOM-MC that was determined by changing the pH of a solution (at room temperature) having 2 ppm of dissolved Dy as the sole lanthanoid element by the addition of NaOH and 0.2M (mole) of $C_6H_{11}NHCH_2SO_3H$. The $C_6H_{11}NHCH_2SO_3H$ is a complex ion that prevents the precipitation of lanthanoid ions. FIG. 7 shows that if DTAR-modified HOM-MC is used to separate Dy, a pH condition of 8 or more is preferable because of the resulting yield of 50% or more, that a pH range of 10 to 12 is more preferable for providing a yield of 80% or more and that a pH of approximately 11 is the most preferable as a Dy extraction condition.

Embodiment 2

Figure 8:
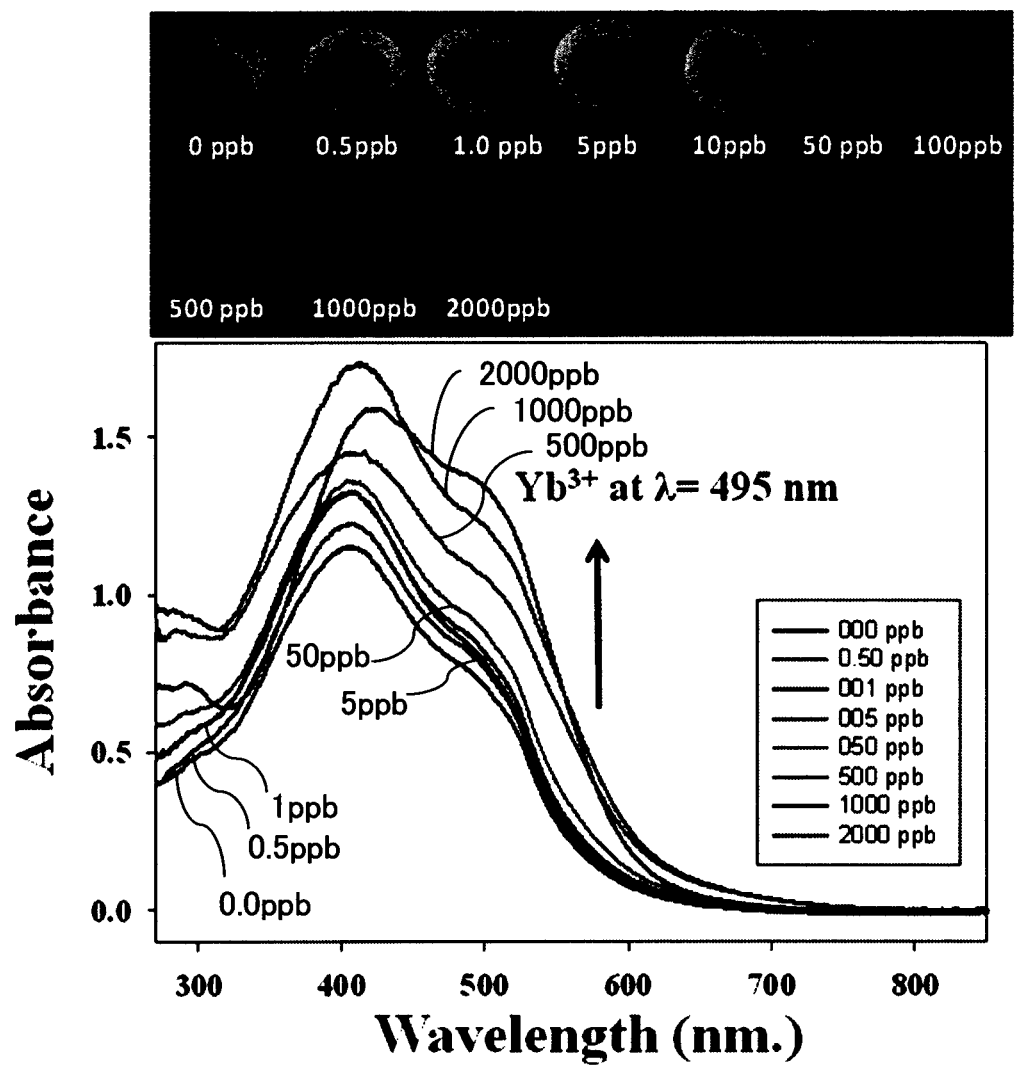
FIG. 8 shows the measured color reaction and UV-vis spectroscopy obtained with a PAR-modified HOM using lanthanoid ion element concentration as a measurement parameter.
Figure 9:
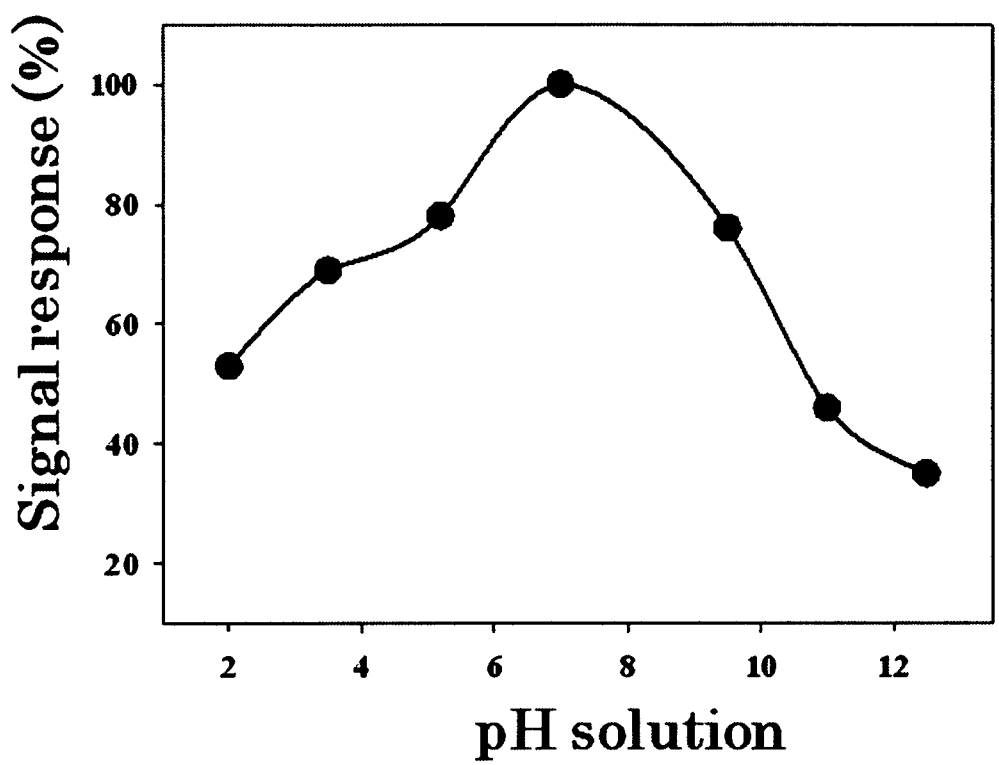
FIG. 9 shows a UV-vis spectroscopy obtained with a PAR-modified HOM using pH as a measurement parameter.

FIG. 8 shows photos (top portion of the figure) of the color reaction and the UV-vis spectroscopy that was obtained with a HOM silica modified with 4-(2-pyridylazo) resorcinol (PAR) serving as the metal-adsorbent compound when only $Yb^{3+}$ ions were added in different concentrations (0 ppb, 0.5 ppb, 1 ppb, 5 ppb, 10 ppb, 50 ppb, 100 ppb, 500 ppb, 1000 ppb (1 ppm) and 2000 ppb (2 ppm)) to a solution with a pH of 7.0 in an experiment to measure wavelength dependence of light absorbance. FIG. 8 shows a peak near a light wavelength of 400 nm with a significant concentration dependence, confirming the capturing of lanthanoid element (Yb) complexes by the HOM-MC. FIG. 9 shows the Yb adsorption capacity of the PAR-modified HOM-MC that was determined by changing the pH of a solution (at room temperature) having 2 ppm of dissolved Yb as the sole lanthanoid element by the addition of NaOH and 0.2M (mole) of 3-morpholinopropanesulfonic acid (MOPS). The 3-morpholinopropanesulfonic acid (MOPS) is a complex ion that prevents the precipitation of lanthanoid ions. FIG. 9 shows that if PAR-modified HOM-MC is used to separate Yb, a pH condition of 10 or less is preferable because of the resulting yield of 50% or more, that a pH range of 5.4 to 9.4 is more preferable for providing a yield of 80% or more and that a pH of approximately 7 is the most preferable as a Yb extraction condition.

Embodiment 3

Figure 10:
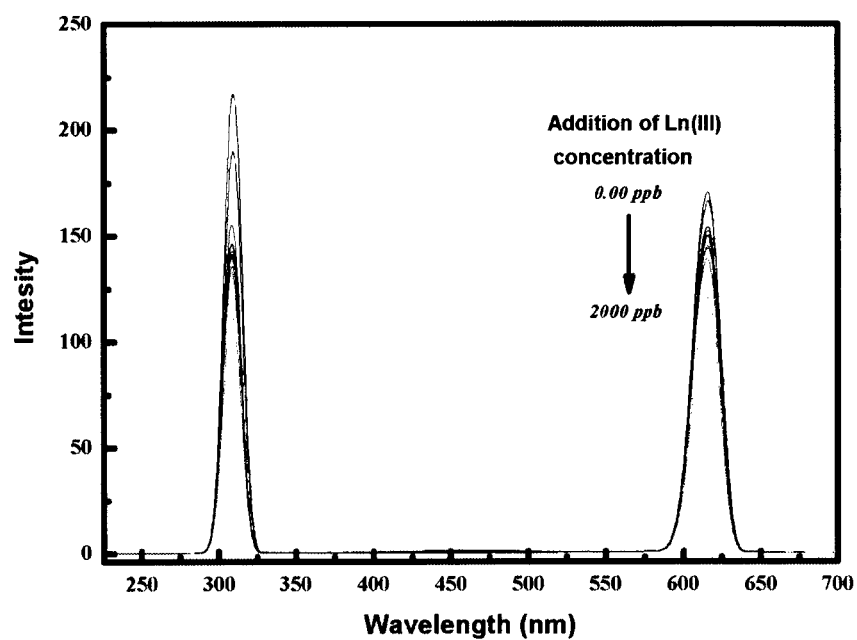
FIG. 10 shows the measured fluorescence signal obtained with a DSNPD-modified HOM using lanthanoid ion element concentration as a measurement parameter.

FIG. 10 shows the effects of the addition of a lanthanoid element ion ($Dy^{3+}$) to a HOM silica that was modified with N,N'disalicylidene-4-nitro-phenylenediamine (DSNPD) which exhibits a quenching reaction. The figure shows the results of the measurement of the fluorescence signal from a DSNPD-modified HOM-MC for a 20 ml solution with a pH of 7 at 25° C. with the lanthanoid element ion added. The solution was adjusted to have a pH of 7 by the addition of NaOH and 0.2M (mole) of 3-morpholinopropanesulfonic acid (MOPS). FIG. 10 shows that as the amount of added lanthanoid element ($Dy^{3+}$) increases, the intensity of the fluorescence signal decreases, confirming that the lanthanoid element complexes were captured by the DSNPD-modified HOM-MC.

Embodiment 4

The present embodiment is an example of the use of an azo reagent-modified HOM for the selective recovery of a specific lanthanoid element. The azo reagent was 1-(2-pyridylazo)-2-naphtol (PAN). Mesoporous silica similar to the one used with Embodiment 1 was used as the HOM.

Figure 11:
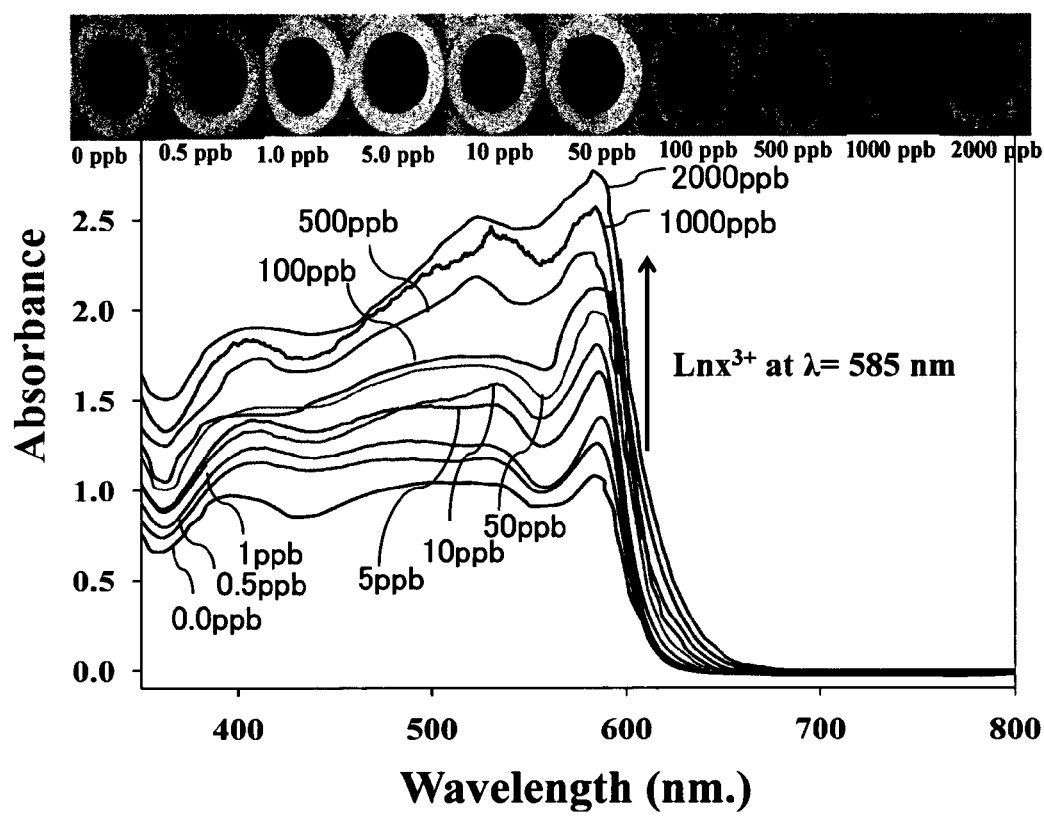
FIG. 11 shows the measured color reaction and UV-vis spectroscopy obtained with a PAN-modified HOM using lanthanoid ion element concentration as a measurement parameter.
Figure 12:
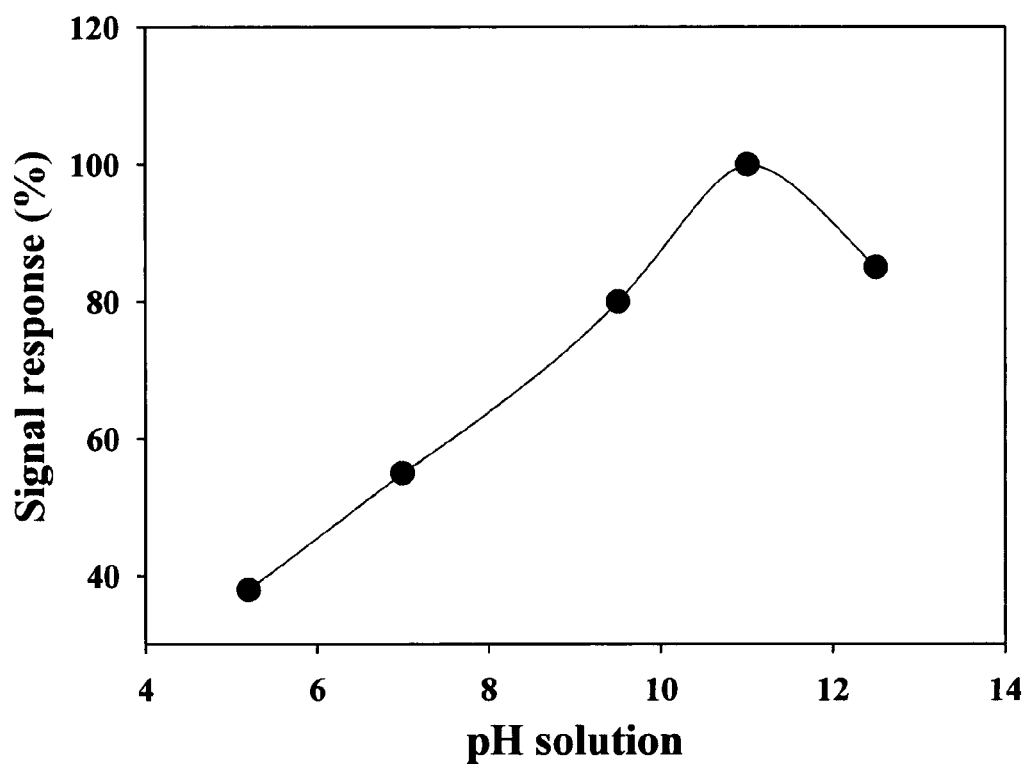
FIG. 12 shows a UV-vis spectroscopy obtained with a PAN-modified HOM using pH as a measurement parameter.

This HOM was modified by 1-(2-pyridylazo)-2-naphtol (PAN) serving as the metal-adsorbent compound. The HOM was immersed in a PAN ethanol solution and then heated in a vacuum to produce a PAN-modified HOM (HOM-MC). With the present embodiment, because a HOM with a Im3m cubic crystal structure was used, it was possible to achieve a high-density PAN modification. FIG. 11 shows the UV-vis spectroscopy of the HOM-MC. FIG. 11 shows the wavelength dependence of light absorption that was measured with a PAN-modified HOM-MC when only $Dy^{3+}$ ions were added in different concentrations (0 ppb, 0.5 ppb, 1 ppb, 5 ppb, 10 ppb, 50 ppb, 100 ppb, 500 ppb, 1 ppm and 2 ppm) to a solution with a pH of 11.5. A significant concentration dependent peak is seen at a light wavelength of 585 nm, confirming the capturing of lanthanoid element complexes by the HOM-MC. FIG. 12 shows the Dy adsorption capacity of the PAN-modified HOM-MC that was determined by changing the pH of a solution having 2 ppm of dissolved Dy as the sole lanthanoid element by the addition of NaOH and 0.2M (mole) of $C_6H_{11}NHCH_2SO_3H$. The $C_6H_{11}NHCH_2SO_3H$ is a complex ion that prevents the precipitation of lanthanoid ions. FIG. 12 shows that if PAN-modified HOM-MC is used to separate Dy, a pH condition of 7 or more is preferable because of the resulting yield of 50% or more, that a pH range of 9 to 12 is more preferable for providing a yield of 80% or more and that a pH of approximately 11 is the most preferable as a Dy extraction condition. Using a pH condition other than a pH of 11 may result in the adsorption of Yb (III) or Th (IV) in addition to the Dy. If, as in this case, there is a plurality of conditions that result in the adsorption of different elements, the desired element can be obtained by repeating the adsorption-separation process a plurality of times while changing the conditions of the metal-dissolved solution or the back-extraction solution. For example, after immersing a PAN-modified HOM-MC in a metal-dissolved solution having a first condition (which adsorbs a plurality of elements) and causing Dy (III) and Yb (III) to be adsorbed by the HOM-MC, the Dy (III) and Yb (III) are separated into a first back-extraction solution. The back-extraction solution is then set to a second condition (which adsorbs only one element) into which the PAN-modified HOM-MC is immersed to cause the adsorption of the Dy (III) by the HOM-MC. The Dy (III) is then separated into the second back-extraction solution. By so doing, Yb (III) is separated from the metal-dissolved solution into the first back-extraction solution, and the Dy (III) is separated into the second back-extraction solution. Alternatively, the PAN-modified HOM-MC can be immersed in a metal-dissolved solution in the second condition (which adsorbs only one element) so that all of the Dy (III) in the metal-dissolved solution is separated into the first back-extraction solution. The metal-dissolved solution is then set in the first condition (which adsorbs a plurality of elements), and the PAN-modified HOM-MC is immersed in it. When this is done, since all of the Dy ions in the metal-dissolved solution have already been separated out, only the Yb ions are adsorbed, and the Yb (III) can be separated in the second back-extraction solution.

The results of an extraction/back-extraction operation on lanthanoid elements using the PAN-modified HOM-MC are shown below. Five types of solution were prepared for the extraction, featuring different ions that were mixed with $Dy^{3+}$, which was present at a concentration of 1 mg/l (1 ppm). Solution (A) contained 4 ppm of $Fe^{3+}$ and 4 ppm of $Pd^{2+}$ as mixed ions. Solution (B) contained 10 ppm each of three types of lanthanoid ions, $Nd^{3+}$, $Yb^{3+}$ and $Eu^{3+}$. Solution (C) contained 15 ppm each of three other types of lanthanoid ions, $Tb^{3+}$, $Eu^{3+}$ and $Sm^{3+}$. Solution (D) contained 15 ppm each of three types of still other lanthanoid ions, $Ce^{3+}$, $Ho^{3+}$ and $La^{3+}$. Solution (E) contained 5 ppm each of the 9 types of lanthanoids that were used in solutions (B) through (D).

0.3 M of a chelate of thiosulfate and tartaric acid were added to these solutions to stabilize the ions up to regions of high pH. Then, NaOH was used to adjust the pH to 11. After immersing the HOM that had been modified with 6 mg of PAN in these solutions and confirming that there was sufficient color reaction, the HOM was removed from the solutions, and the concentrations of the respective ions present in the residual solution were measured. After washing the removed modified HOMs, back-extraction was performed using 0.2 M nitric acid, and the concentration of various ions in the nitric acid was measured by ICP elemental analysis. Table 1 below shows the results of the adsorption/separation/recovery from the mixed ion system. In each of solutions (A) through (E), the initial solution concentration of $Dy^{3+}$ was 1 ppm, was 0.00 ppm (below the detectable limit) in the processed solution, and was 0.8 ppm in the back-extraction solution. These results show that, regardless of the coexistent ions, $Dy^{3+}$ ions are selectively adsorbed/separated/recovered into a back-extraction solution of nitric acid. The yield is extremely high at approximately 80%.

TABLE 1

|  | $Dy^{3+}$ (common to each solution) | Solution (A) coexistent ions | Solution (B) coexistent ions | Solution (C) coexistent ions | Solution (D) coexistent ions | Solution (E) coexistent ions |
| --- | --- | --- | --- | --- | --- | --- |
| Initial solution concentration (ppm) | 1 | 4 | 10 | 15 | 10 | 5 |
| Post-processing solution concentration (ppm) | 0.00 | 3.9 | 9 | 13 | 9.5 | 3 |
| Back-extraction solution concentration (ppm) | 0.8 | 0 | 0 | 0 | 0 | 0 |

As afore-described, the HOM that is obtained by the addition of an acidic aqueous solution to a mixture of a silica source and a surfactant has a large surface area and a highly ordered structure. Because of the highly ordered structure, the atoms constituting the inner walls of the HOM can be used as a dense arrangement of ends for the modification by (and carrying of) complex-forming molecules. Also, since there is no steric hindrance effect created by an acidic aqueous solution as seen with polymers, a high response speed is achieved in addition to the high-density. Furthermore, because of the homogenous and stable carrying structure, the degradation of the structure carrying the metal-adsorbent compounds is suppressed. By carrying the metal-adsorbent compounds with a high-density on the HOM, an adsorption material with a high capacity for forming complexes per unit volume, and hence a high ion adsorption capacity per unit volume, is formed. Because using a HOM as a carrying body improves the ion adsorption capacity, complex-forming molecules, which previously had not been used in combination with polymer-based carrying bodies because of the ion adsorption capacity not being very high, can be used to obtain a high ion adsorption capacity per unit volume. Furthermore, as further described below in Embodiments 5 and 6, nanotubes and nanorods can also be used as the nanostructures.

Embodiment 5

Figure 13:
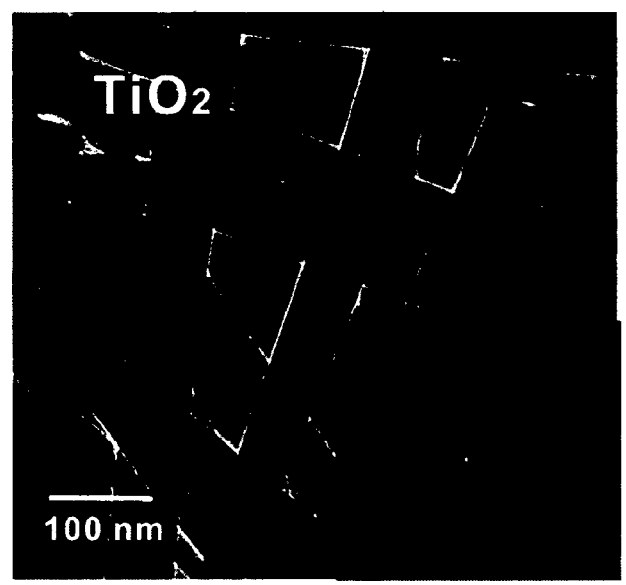
FIG. 13 shows transmission electron microscope (TEM) photos of nanotubes.

The present embodiment shows an example of the synthesis of a nanotube structure of titanium oxide that can be used as nanostructures. 8 g of $TiOSO_4$, 10 g of ethanol and 5 g of an aqueous solution of 1M $H_2SO_4$ were mixed to create an emulsified solution. 4 g of Pluronic (registered trademark) F108 triblock copolymer surfactant that was dissolved in 5 g of ethanol were quickly added. The cation mass ratio was $TiOSO_4:F108:H_2O/H_2SO_4=1:0.5:0.6$. The ethanol was removed at a temperature of 40° C. to 45° C. by a vacuum pump that was connected to a rotary evaporator. A gel-like solid was formed within 5 minutes. The organic components were removed by a subsequent 8 hours of calcination at 450° C. The nanotube structures of titanium oxide that were obtained in this manner had a BET specific surface area of 108 $m^2/g$, a tube diameter of 9.3 nm and a nanotube density of 0.58 $cm^3/g$. FIG. 13 shows a transmission electron microscope (TEM) image of the $TiO_2$ nanotube structures. FIG. 13 confirms the synthesis of nanotube structures having a uniform diameter.

Embodiment 6

The present embodiment shows an example of the synthesis of nanorod structures made of aluminum oxide that can be used as nanostructures. Nanorod structures made of aluminum oxide can be easily synthesized using the following process. First, after dissolving 8 g of an $Al(NO_3)_3$ precursor in 20 ml of water, 4 g of a surfactant (cetyltrimethyl ammonium bromide (CTAB)) dissolved in 10 ml of water was mixed in and stirred for 1 hours. This was followed by a dropwise addition of an ammonia solution of a high concentration for 30 minutes while stirring until the pH becomes 10. The reaction mixture was moved to an autoclave made of stainless steel with a Teflon-treated inner surface. The autoclave was sealed, and the interior of the oven was kept at 150° C. for 24 hours. After the autoclaving, the temperature was allowed to drop to room temperature by natural heat dissipation. The mixtures were separated by centrifuge. The precipitates were washed well three times each using distilled water and ethanol and then calcinated for hours at 500° C. The cation mass ratio was $Al(NO_3)_3:CTAB:H_2O=1:0.5:3.75$. The nanorod structures of aluminum oxide had a BET specific surface area of 212 $m^2/g$, the nanorods had a diameter (minor-axis direction) of 8.3 nm, and the nanorod density was 0.69 $cm^3/g$.

Embodiment 7

With the present embodiment, a masking agent was used to selectively extract the target metal. A masking agent is an interfering substance that functions to prevent metals other than the target metal to react with the metal-absorbent compound so that only the target metal can be selectively extracted from a plurality of elements.

Specifically, the present embodiment is an example where the afore-described PAN-modified HOM (HOM-MC) and a masking agent (sodium citrate) were used to selectively recover one lanthanoid element (Dy (III)) as a target metal from a magnetic substance that included a plurality of lanthanoid elements and other elements, namely, (Dy (III), Nd (III), Fe (III), Al (III), Cu (II) and B (III)).

First, as a magnetic substance to be used as the experimental specimen, a metal-dissolved solution was prepared containing a mixture of 6 different ions ($Dy^{3+}$, $Nd^{3+}$, $Fe^{3+}$, $Al^{3+}$, $Cu^{2+}$ and $B^{3+}$). To obtain the metal-dissolved solution, a suitable amount of sodium hydroxide (NaOH) was added to 1 liter of 0.2M potassium chloride (KCl) to adjust the pH to 12.5. 4 ml of the solution so prepared and collected contained, as mixed ions, 1 ppm of $Dy^{3+}$, 75 ppm of $Nd^{3+}$, 50 ppm of $Fe^{3+}$, 5 ppb of $Al^{3+}$, 5 ppb of $Cu^{2+}$ and 5 ppm of $B^{3+}$. 4 ml of 0.7M sodium citrate solution was added as a masking agent to the metal-dissolved solution, and a requisite amount of water was added to create a 20 ml solution. To extract the target metal, this was followed by the addition of 20 mg of PAN-modified HOM to this solution, which was then stirred for 30 minutes.

Next, after filtering the solution, the adsorbed/isolated/recovered material (HOM-MC-Mt) with the adsorbed target metal (Dy (III)) was washed with water to remove the non-target metals. The target metal, (Dy (III)), was almost non-existent in the filtrate solution. Next, the adsorption/isolation/recovery material was placed in a beaker to which 10 ml of 0.05M nitric acid was added as a back-extraction solution and stirred for 10 minutes to extract the target metal. The back-extraction solution was filtered, and the adsorption/isolation/recovery material was washed with water. The target metal, i.e., Dy (III), was present in the back-extraction solution filtrate and was also present in some quantity in the adsorption/isolation/recovery material, i.e., the PAN-modified HOM. If a masking agent is not used, it is not necessary to add the 0.7M sodium citrate solution to the metal-dissolved solution.

Figure 14:
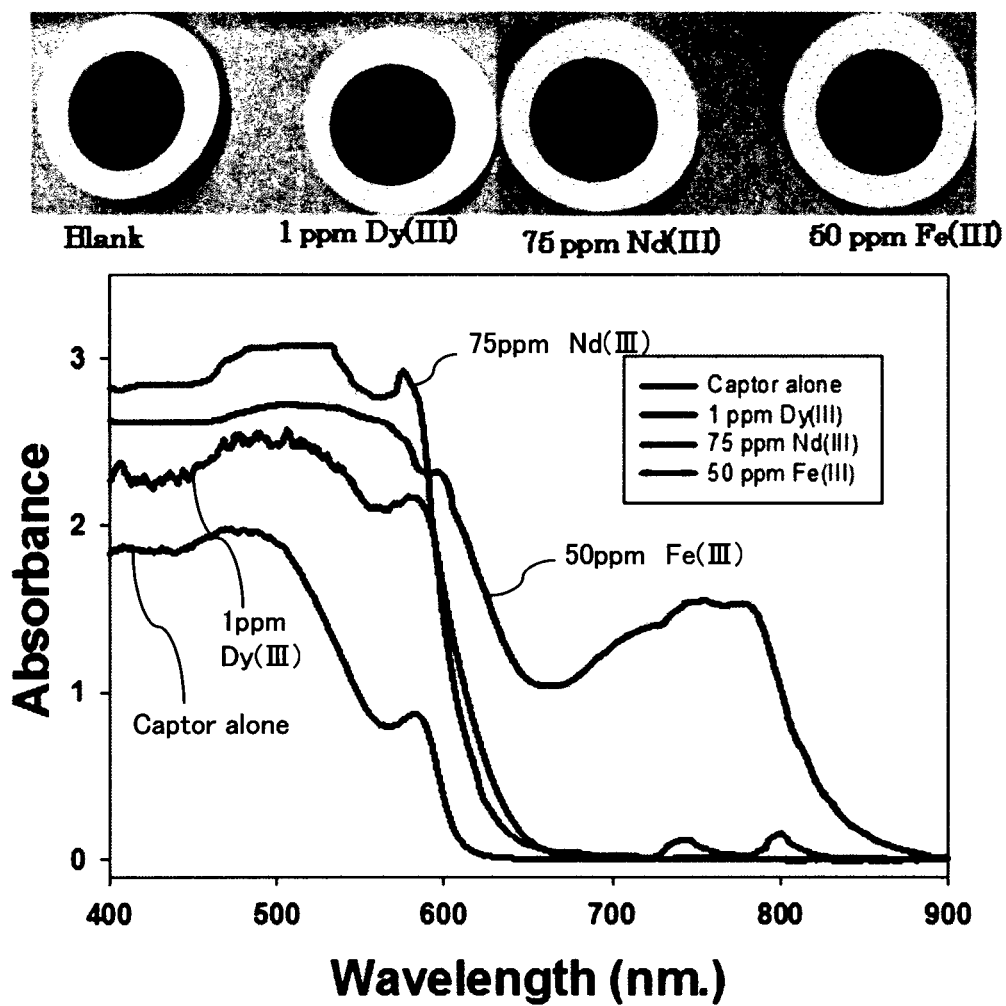
FIG. 14 shows the measured color reaction and UV-vis spectroscopy obtained with a PAN-modified HOM for each of the elements.

If a masking agent is not used, the PAN-modified HOM may adsorb other non-target metals (such as Nd (III) and Fe (III)) in addition to the target metal (such as Dy (III)). For comparison, 1 ppm of $Dy^{3+}$, 75 ppm of $Nd^{3+}$, 50 ppm of $Fe^{3+}$, 5 ppb of $Al^{3+}$, 5 ppb of $Cu^{2+}$ or 5 ppm of $B^{3+}$ was added to 4 ml of a solution with a pH of 12.5 and a requisite amount of water was added to create a 20 ml solution each of the metal-dissolved solutions. To each of the metal-dissolved solutions, PAN-modified HOM was added and stirred for 30 minutes. Each of the metal-dissolved solutions was filtered, and the PAN-modified HOMs was removed. The PAN-modified HOMs with the adsorbed respective metals were analyzed by ultraviolet-visible-near infrared (UV-VIS-NIR) spectrophotometer. Interaction was noted between the PAN-modified HOM and a number of metal ions. FIG. 14 shows the color reaction between the PAN-modified HOM and each of Dy (III), Nd (III) and Fe (III) at pH 12.5 and the UV-vis spectroscopy of the PAN-modified HOM that had adsorbed the different respective metals. The color reaction shown in FIG. 14 shows a strong reaction between the PAN-modified HOM and Nd (III) and Fe (III).

The use of a masking agent (0.7M sodium citrate), which prevents the adsorption of the non-target metals, i.e., Fe (III) and Nd (III), was considered as a way to selectively extract only Dy (III) from a metal-dissolved solution containing a mixture of a plurality of types of metal ions. The use of this masking agent allows only Dy (III) to be selectively and efficiently extracted.

As FIG. 14 shows, since Nd (III) and Fe (III) strongly interacts with PAN-modified HOM, it was difficult to only extract Dy (III) using the PAN-modified HOM. However, the interaction between PAN-modified HOM and Nd (III) or Fe (III) is lessened in the presence of a 0.7M sodium citrate solution.

Figure 15:
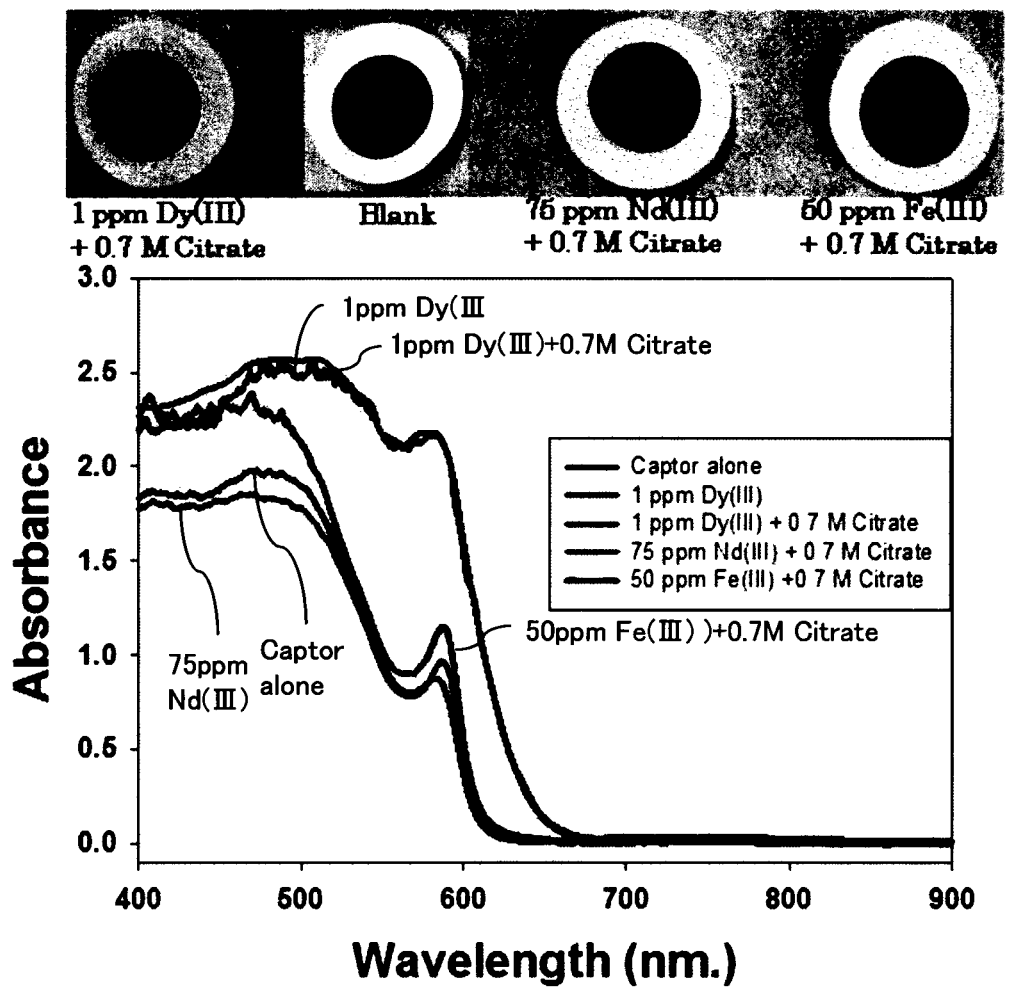
FIG. 15 shows the measured color reaction and UV-vis spectroscopy obtained with a PAN-modified HOM with a masking agent added to each of the elements.

FIG. 15 shows the color reaction between the PAN-modified HOM and each of Dy (III), Nd (III) and Fe (III) at pH 12.5 with the addition of 0.7M sodium citrate as a masking agent, and the UV-vis spectroscopy of the PAN-modified HOM that had adsorbed the different respective metals. FIG. 15 shows that the amount of color change is substantially similar among the case where PAN-modified HOM was added to a metal solution added only with Nd (III) or Fe (III) and the case of a blank PAN-modified HOM. Furthermore, according to the results of UV-vis spectroscopy shown in FIG. 15, in the case of a PAN-modified HOM that had adsorbed the target metal, i.e., Dy (III), whether or not a masking agent was used caused almost no change in the UV-vis spectroscopy. Furthermore, according to FIG. 14 and FIG. 15, in the case of a metal-dissolved solution containing the target Dy (III) metal, the color reaction is substantially similar whether or not a masking agent is used. Such quantitative analysis shows that the use of a masking agent is effective for the efficient and selective extraction (extraction rate of 90% or more) of the target metal, i.e., Dy (III), from a metal-dissolved solution containing a plurality of metal ions. The extraction rate is defined as follows: concentration recovery (CR)/concentration original (CO)×100(%).

Figure 16:
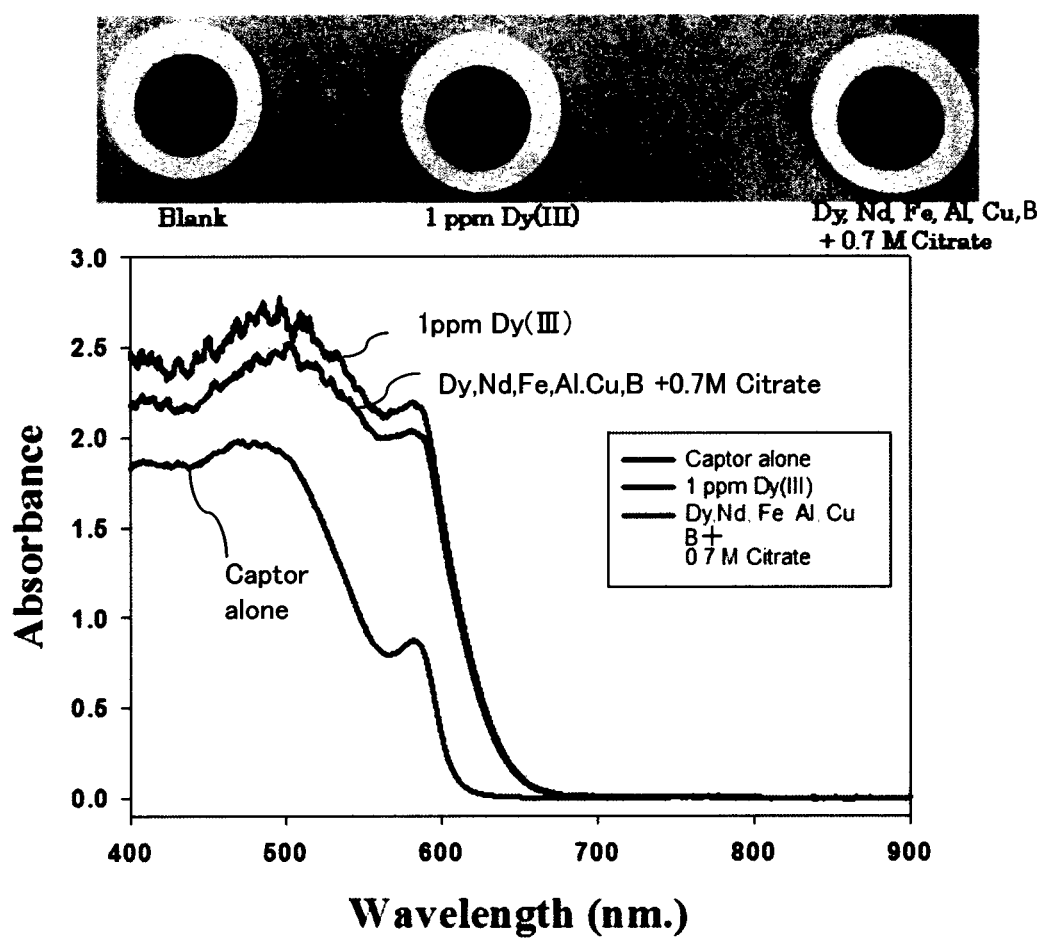
FIG. 16 shows the measured color reaction and UV-vis spectroscopy obtained with a PAN-modified HOM when a masking agent was added to a metal-dissolved solution containing a plurality of elements.

According to the color reaction shown in FIG. 16, the color change is substantially similar between the metal-dissolved solution containing 6 types of metal ions to which PAN-modified HOM was added and the solution containing only $Dy^{3+}$ to which PAN-modified HOM was added. Furthermore, according to the UV-vis spectroscopy shown in FIG. 16, the UV-vis spectroscopy is similar between that of the PAN-modified HOM that was removed from the metal-dissolved solution containing 6 types of the metal ions and the PAN-modified HOM that was removed from the solution containing only $Dy^{3+}$. This means that a PAN-modified HOM can selectively extract (with an extraction rate of 90% or more) only Dy (III) as the target metal even from an environment where 75 ppm of Nd (III), 50 ppm of Fe (III), 5 ppb of Al (III), 5 ppb of Cu (II) and 5 ppm of B (III) coexist.

Because the series of metal complex-forming molecules that have been used as metal-adsorbent compounds in spectroscopic analysis until now have superior selectivity to metal ions, an adsorption material with superior ion adsorption capacity is realized by carrying such complex-forming molecules on a nanostructure and creating an environment suitable for the formation of complexes in the solution. Furthermore, because carrying bodies such as HOMs, nanotubes structures and nanorod structures are stable, it is possible to perform a back-extraction by changing the solution environment while holding the complex-forming molecules on the carrying body. In particular, adsorption of lanthanoid elements and actinoid elements can be performed with a high level of selectivity by using a solid adsorption material having nanostructures that carry nitrogen-containing aromatic compounds such as azos and amines with selective spectroscopic properties to targeted lanthanoid element metals and actinoid element metals and by controlling the solution environment such as pH to be suitable for the targeted lanthanoid elements and actinoid elements. Moreover, by combining with a back-extraction environment, the adsorbed lanthanoid and actinoid elements can be adsorbed, separated and recovered. Furthermore, as evidenced by the fact that nitrogen-containing aromatic compounds such as azos and amines used for the adsorption of lanthanoid and actinoid element ions were originally used for spectroscopic measurements, they have the ability to adsorb ions by the selective formation of complexes even from diluted solutions having targeted elements in concentration of a ppb level. For this reason, they can be used even in a diluted state such as that encountered with soil (typically, several ppm) or seawater (typically, several ppb).

As afore-described, with the present invention, highly-ordered mesoporous silica that was manufactured from organic silicon compounds and surfactants is used as nanostructures that carry metal-adsorbent compounds such as chelate compounds that selectively adsorb targeted metal (ions) to the mesoporous silica. The mesoporous silica that carries the metal-adsorbent compounds is brought into contact with a solution with dissolved target metals (ions) so as to cause a selective adsorption of the target metals (ions) to the metal-adsorbent compounds carried on the mesoporous silica. This is followed by a chemical treatment of the mesoporous silica that carries the metal-adsorbent compounds to which the target metals (ions) are adsorbed so as to filter (separate) the target metals (ions) from the metal-adsorbent compounds that are carried on the mesoporous silica and to recover the target metals. The mesoporous silica that carried the metal-adsorbent compounds from which the target metals (ions) were filtered (separated) can be repeatedly reused.

Even though the present invention provides a material and a method for the efficient and inexpensive extraction of rare metals that are included in urban minerals, the present invention can be, as evident from the foregoing explanation, used for the extraction, adsorption and back-extraction of various metals from not just urban minerals but also from regular minerals containing a variety of metals or for the extraction, adsorption and back-extraction of metals from a solution containing dissolved metals. Furthermore, it should be obvious that, by carrying on the nanostructure such metal-adsorbent compounds as chelate compounds with a selective adsorption to metals other than the afore-mentioned (including rare metals and non-rare metals), the present invention can be used for the extraction, adsorption and back-extraction of such target metals as well. Needless to say, any description that is provided in a part of the specification but not specifically described elsewhere in the specification applies equally throughout the specification unless a contradiction is created in its application.

INDUSTRIAL APPLICABILITY

The present invention can be used in industrial fields where metals have to be recovered or eliminated from substances or materials that include various metals.

The invention claimed is:
1. Nanostructures that carry metal-adsorbent compounds capable of adsorbing a target metal that is selected from the group consisting of lanthanoid elements and actinoid elements, wherein said target metal is present in a solution, and wherein said nanostructures include highly ordered mesoporous silica.

2. The nanostructures according to claim 1 wherein said metal-adsorbent compounds are organic compounds with selective spectroscopic properties to the target metal.

3. The nanostructures according to claim 2 wherein said organic compounds are nitrogen-containing aromatic compounds.

4. The nanostructures according to claim 3 wherein said nitrogen-containing aromatic compounds are aromatic azo compounds or aromatic amine compounds.

5. The nanostructure according to claim 1 wherein said metal-adsorbent compounds are one or more compounds selected from the group consisting of:
   i) 3-(5-bromo-2-pyridylazo)-5-(diethylamino)phenol (3,5-diBr-PADAP),
   ii) (5-bromo-2-pvridvlazo)-5-(diethvlamino)phenol (5-Br-PADAP),
   iii) 4-(2-thiazylazo) 6-dodecylresorcinol (DTAR),
   iv) 4-(2-pyridylazo) resorcinol (PAR),
   v) N,N'disalicylidene-4-nitro-phenylenediamine (DSNPD), and
   vi) 1-(2-pyridylazo)-2-naphtol (PAN).

6. The nanostructures according to claim 1 wherein said nanostructures include porous structures and nanorod structures.

7. A method for the extraction of lanthanoid elements and actinoid elements comprising:
   an adsorption process wherein a metal-dissolved solution containing a target metal selected from the group consisting of a lanthanoid element and an actinoid element is made to come into contact with nanostructures that carry metal-adsorbent compounds that are adsorbent to said target metal so that said target metal in said solution is adsorbed by said metal-adsorbent compounds, wherein said nanostructures include highly ordered mesoporous silica; and
   a target metal separation process wherein said nanostructures that carry metal-adsorbent compounds that adsorbed said target metal during said adsorption process are made to come into contact with a back-extraction solution so that said target metal that is adsorbed by said metal-adsorbent compounds is transported to said back-extraction solution.

8. The extraction method according to claim 7 wherein said metal-adsorbent compounds are organic compounds with selective spectroscopic properties to said target metal.

9. The extraction method according to claim 8 wherein said organic compounds are nitrogen-containing aromatic compounds.

10. The extraction method according to claim 9 wherein said nitrogen-containing aromatic compounds are aromatic azo compounds or aromatic amine compounds.

11. The extraction method according to claim 8 wherein, during said adsorption process, said target metal is adsorbed by said metal-adsorbent compounds while monitoring at least one of color reaction or spectroscopic properties.

12. The extraction method according to claim 8 wherein, during said target metal separation process, the target metal is transported from said metal-adsorbent compounds to said back-extraction solution while monitoring at least one of color reaction or spectroscopic properties.

13. The extraction method according to claim 7 wherein said metal-adsorbent compounds are one or more compounds selected from the group consisting of:
   i) 3-(5-bromo-2-pyridylazo)-5-(diethylamino)phenol (3,5-diBr-PADAP),
   ii) (5-bromo-2-pyridylazo)-5-(diethylamino)phenol (5-Br-PADAP), iii) 4-(2-thiazylazo)6-dodecylresorcinol (DTAR),
iv) 4-(2-pyridylazo) resorcinol (PAR),
v) N,N'disalicylidene-4-nitro-phenylenediamine (DSNPD), and
vi) 1-(2-pyridylazo)-2-naphtol (PAN).

14. The extraction method according to claim 7 wherein only the target metal is adsorbed by said metal-adsorbent compounds during said adsorption process by preparing the chemical environment of said metal-dissolved solution so as to exhibit a selective separation property to the target metal.

15. The extraction method according to claim 7 wherein target metal ions that are adsorbed by said metal-adsorbent compounds are transported to the back-extraction solution during said target metal separation process by preparing said back-extraction solution to have predetermined conditions.

16. The extraction method according to claim 7 wherein nanostructures from which target metal ions that were adsorbed by said metal-adsorbent compounds have been transported to the back-extraction solution during said target metal separation process are again brought into contact with said solution in said adsorption process.

17. The extraction method according to claim 7 wherein said nanostructures include porous structures and nanorod structures.

18. In a method for extracting a specific target metal selected from a plurality of lanthanoid elements present in a metal-dissolved solution containing a plurality of lanthanoid elements and other elements, a method for extraction of lanthanoid elements comprising:
(A) adding a masking agent to said metal-dissolved solution to prevent the extraction of elements other than said target metal;
(B) contacting said metal-dissolved solution with nanostructures that carry metal-adsorbent compounds that are adsorbent to said target metal so that only said target metal in said solution is selectively adsorbed by said metal-adsorbent compounds, wherein said nanostructures include highly ordered mesoporous silica; and
(C) contacting said nanostructures that carry metal-adsorbent compounds that adsorbed said target metal during (B) with a back-extraction solution so that said target metal that is adsorbed by said metal-adsorbent compounds is transported to said back-extraction solution.

19. The method according to claim 18 wherein said metal-adsorbent compounds are 1-(2-pvridvlazo)-2-naphtol (PAN) compounds.

20. The method according to claim 19 wherein said masking agent is sodium citrate.

* * * * *